United States Patent [19]
Takahashi et al.

[11] Patent Number: 5,982,998
[45] Date of Patent: *Nov. 9, 1999

[54] DOT-DATA SHIFTING OF IMAGE DATA FOR USE IN PRINTING

[75] Inventors: Kiichiro Takahashi, Kawasaki; Takatoshi Ohta; Masahiro Nagatani, both of Yokohama; Kazuyoshi Sumiuchi, Machida, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,614

[22] Filed: Apr. 29, 1997

Related U.S. Application Data

[63] Continuation of application No. 08/602,568, Feb. 14, 1996, abandoned.

[30] Foreign Application Priority Data

Feb. 15, 1995 [JP] Japan .................................... 7-026743

[51] Int. Cl.⁶ .................................................... G06K 15/00
[52] U.S. Cl. ........................................... 395/117; 395/102
[58] Field of Search ..................... 395/102, 109, 395/110, 115, 117, 108; 345/470, 472, 523, 430, 429, 431, 436, 439; 358/428, 431, 454, 451, 531, 533, 525; 382/275, 274, 266

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,400,791 | 8/1983 | Kitado | 346/900 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,182,575 | 1/1993 | Kato et al. | 346/108 |
| 5,270,728 | 12/1993 | Lund et al. | 395/108 |
| 5,309,548 | 5/1994 | Ohta et al. | 395/109 |
| 5,483,625 | 1/1996 | Roberton et al. | 395/117 |
| 5,488,398 | 1/1996 | Matsubara et al. | 346/43 |

FOREIGN PATENT DOCUMENTS

| | | |
|---|---|---|
| 0513989 | 11/1992 | European Pat. Off. . |
| 0622758 | 11/1994 | European Pat. Off. . |
| 0625765 | 11/1994 | European Pat. Off. . |
| 5-246033 | 9/1933 | Japan . |
| 54-56847 | 5/1979 | Japan . |
| 59-123670 | 7/1984 | Japan . |
| 59-138461 | 8/1984 | Japan . |
| 60-71260 | 4/1985 | Japan . |
| 4-301460 | 10/1992 | Japan . |
| 5-10471 | 4/1993 | Japan . |
| 6-171091 | 6/1994 | Japan . |
| 6-198906 | 7/1994 | Japan . |

*Primary Examiner*—Arthur G. Evans
*Attorney, Agent, or Firm*—Fitzpatrick, Cella, Harper & Scinto

[57] ABSTRACT

A solid area and edges are detected from original data to be printed. An arbitrary raster of the solid area is shifted by a unit of dot-to-dot distance corresponding to a resolution having twice the dot density of the resolution of the original data, while preserving the data representing the edges so that the edges remain unchanged. Printing is performed on the basis of the above shifted data. The shifting of the dot data prevents the generation of mist and makes it possible to print a high-quality image at a high speed. Thus, the invention provides a printing method and apparatus capable of forming a high-quality image at a high speed.

37 Claims, 22 Drawing Sheets

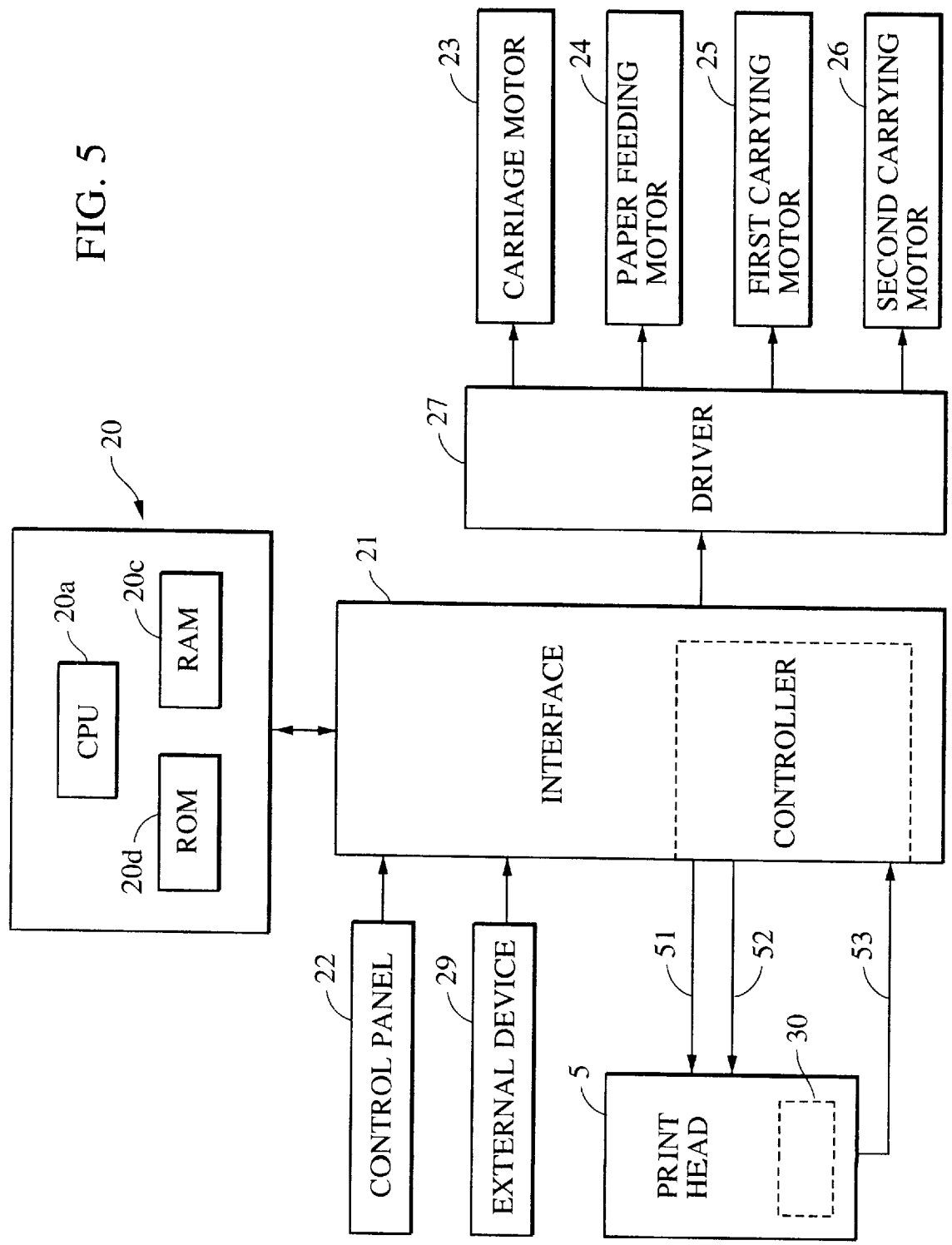

FIG. 10
DOT UNDER CONSIDERATION
 → ● : SOLID
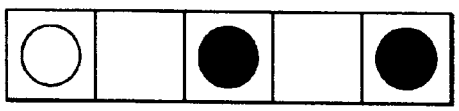
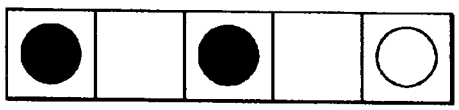
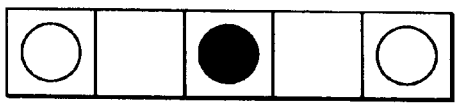 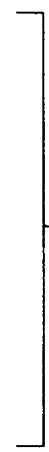 → ○ : NOT SOLID
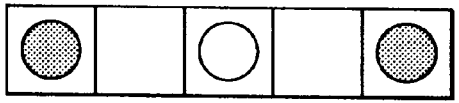
 : Don't care FIG. 14
THE RESULT FOR THE CASE WHERE THE DIVISION OF THE VERTICAL POSITION OF THE RASTER UNDER CONSIDERATION BY 4 HAS A REMAINDER EQUAL TO 0 OR 2.
THE RESULT FOR THE CASE WHERE THE REMAINDER EQUALS 1.
THE RESULT FOR THE CASE WHERE THE REMAINDER EQUALS 3.

ORIGINAL DATA

SHIFTED DATA

EDGE          EDGE

FIG. 19
ORIGINAL DATA D11
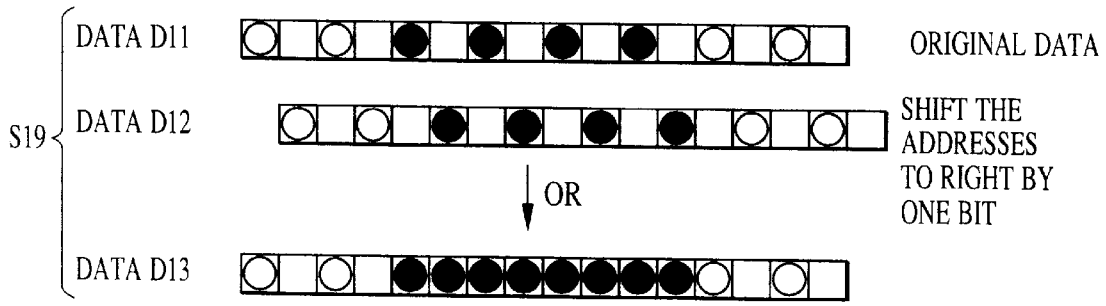
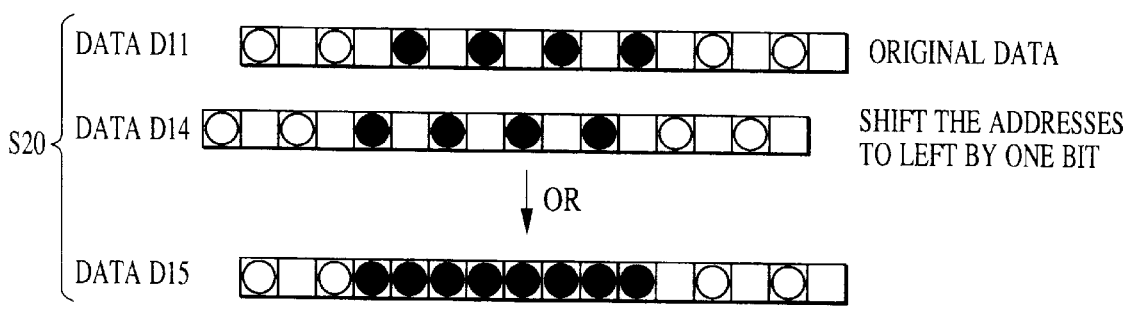
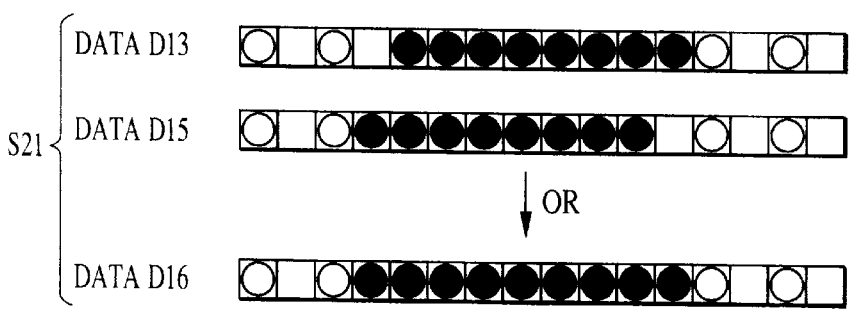
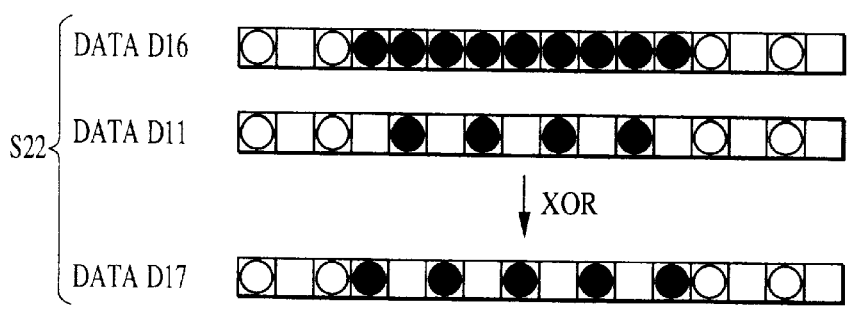

ORIGINAL DATA

SHIFTED DATA

EDGE          EDGE

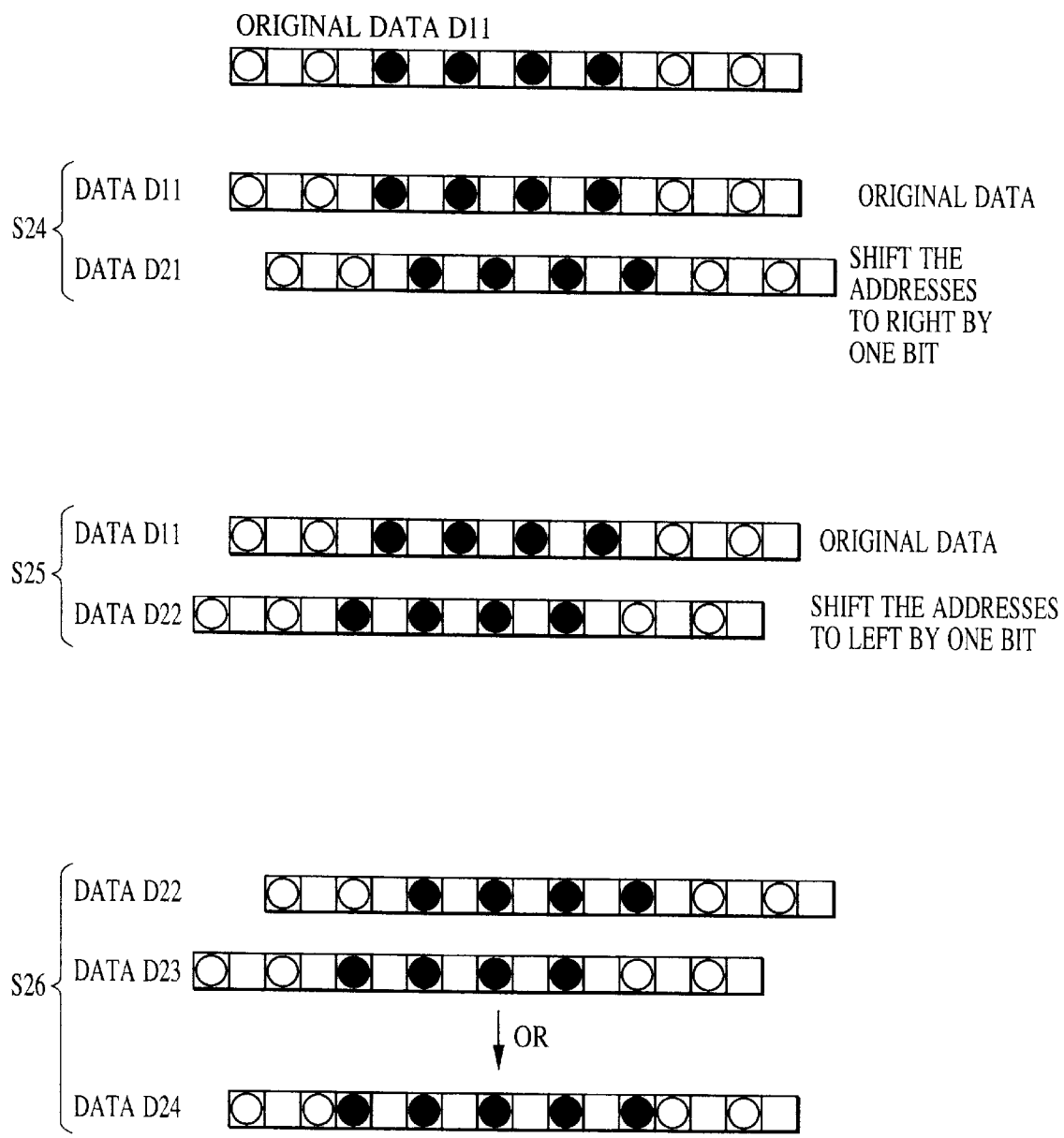

DOT-DATA SHIFTING OF IMAGE DATA FOR USE IN PRINTING

This application is a continuation of application Ser. No. 08/602,568, filed Feb. 14, 1996, now abandoned.

BACKGROUND OF THE INVENTION

1. Field of the Invention

The present invention relates to a printing method for reducing the problems occurring when printing a high-resolution image using a resolution expanding technique or the like, and to a printing apparatus using such the printing method.

2. Description of the Related Art

In recent years, various OA (office automation) devices such as personal computers, word processors, and personal information terminal devices have become very popular. A printing apparatus, usually called a printer, is widely used as a device for outputting information, given from such an OA device, onto a printing medium. With the increasing popularity of OA systems and devices, multimedia has become popular in various applications. As a result, it is often required that computers should deal with information including not only simple characters but also full color images. Such the changes in the environment surrounding the information systems and devices have increased the requirements for high operating speed and high image quality in printers.

One known technique for increasing the operation speed and the image quality of printers is to employ a multi-element print head on which a plurality of printing elements are disposed. It is known to increase the efficiency of driving the multi-element print head by grouping the printing elements into blocks.

The block driving technique will be described in further detail below referring to FIG. 1.

In FIG. 1, reference symbols n1, n2, . . . , n16 denote relative positions of printing elements of a print head. In the case of a printer of the bubble-jet type (hereafter also referred to as a BJ printer) in which ink is heated by a heating element so that a bubble is generated in the ink thereby emitting an ink droplet, nozzles for emitting ink are disposed at positions denoted by these symbols n1 to n16. The nozzles n1 to n16 are aligned in a straight line so that they form a series of nozzles. A printing operation is performed while moving the series of nozzles in a horizontal direction shown in FIG. 1. Therefore, the positions n1 to n16 shown in FIG. 1 also correspond to the positions at which image elements are formed by ink droplets emitted by the nozzles.

In FIG. 1, a plurality of series of dots shown on the right side denote relative positions at which the nozzles are located as the print head travels, wherein reference numerals 1 to 16 shown at the top of the figure denote the positions of the series of nozzles.

Although the number of nozzles disposed on one head usually ranges from a few tens to a few hundreds, it is assumed here for convenience of explanation that the ink-jet print head has 16 nozzles.

In FIG. 1, the distance between adjacent vertical lines at equal intervals denotes the pitch of image dot elements. In this example, the printer is assumed to have a resolution of 360 dots per inch and thus have a dot pitch of about 71 μm. In the present example, the print head is mounted on a printer so that the series of dot elements of the print head is slanted by certain degrees from the direction perpendicular to the scanning direction of the print head so that dots are printed exactly along a vertical line when the printing elements of the print head are driven in a time division fashion. In the time division driving technique, a plurality of printing elements are grouped into some blocks so that each block consists of a plurality of printing elements, and the printing operation is performed block by block at predetermined time intervals. Therefore, in the printing operation according to the time division driving technique, a driving signal is not applied to all printing elements at the same time. This prevents the driving voltage from dropping down to a level smaller than a lower limit, and also prevents the nozzles of the ink-jet printer from becoming short of ink, which would otherwise occur when ink was emitted from a great number of nozzles at the same time. If the time division driving technique is applied to a print head on which all printing elements or blocks are disposed in a line exactly oriented along the vertical direction, the printed image will be slanted by an amount corresponding to the time difference in the driving operation. To avoid the above problem, the orientation of the printing elements on the print head is slanted by an amount corresponding to the time difference in the driving operation so that each printing element emits an ink droplet at a position exactly located on a vertical line.

As shown in FIG. 1, the orientation of the series of nozzles on the print head is slanted so that the nozzle 5 (n5) is located at a position preceding the nozzle 1 (n1) wherein the distance measured in the horizontal direction between the nozzle 5 (n5) and the nozzle 1 (n1) is equal to the resolution pitch (the minimum dot-to-dot distance). While traveling over a printing medium, the above-described print head forms dots on the printing medium according to the print data thereby forming an image on the printing medium. For example, in the case where one line of dots is printed along a column denoted by the arrow in FIG. 1, the nozzle 1 is driven when the print head comes to a position denoted by reference numeral 1 in FIG. 1, and the nozzle 2 is driven when the print head comes to a position 2. The remaining nozzles 3 to 16 are driven in a similar manner thereby forming dots along a vertical line as shown in FIG. 1.

In the print head described above, the nozzle 1 (n1), nozzle 5 (n5), nozzle 9 (n9), and nozzle 13 (n13) are located so that they are apart from each other by an amount corresponding to one column and thus they are driven at the same time. This means these nozzles belong to the same block. Similarly, the nozzle 2 (n2), nozzle 6 (n6), nozzle 10 (n10), and nozzle 14 (n14) are grouped into another block, the nozzle 3 (n3), nozzle 7 (n7), nozzle 11 (n11), and nozzle 15 (n15) are grouped into still another block, and the nozzle 4 (n4), nozzle 8 (n8), nozzle 12 (n12), and nozzle 16 (n16) are grouped into the final block. In this example, the maximum number of nozzles which are driven at the same time is four, and a greater number of nozzles are never driven at the same time. In contrast, in the case of print heads which are not based on the time division technique, there is a possibility that all sixteen nozzles disposed on a print head are driven at the same time. Therefore, the time division driving technique leads to a great reduction in the capacity of the power source and thus a reduction in cost. Furthermore, in the present example, since printing elements are disposed across a plurality of columns (printing positions corresponding to the resolution pitch), it is easier to accurately control the target position at which an ink droplet arrives than in the case in which one column is printed during one driving cycle using a print head on which nozzles are disposed along a vertical line. Thus, a straight line along a column can be formed by controlling the driving timing of the printing elements present on the column and also by controlling the movement of the printing elements. This means that the slanted-nozzle print head offers a high-quality image.

One known technique for achieving high quality in a printed image is to form dots by driving each printing element in a PWM fashion using a multi-division driving pulse such as that shown in FIG. 2, in which the pulse width of the driving pulse is modulated according to the status of the print head. In the example of the multi-division pulse shown in FIG. 2, after a setup period P0, a pre-pulse P1 is applied so as to generate thermal energy within the range which does not lead to emission of ink. Following the pre-pulse P1, the pulse is turned off during a period P2 (off-period). After that, a main pulse P3 is applied thereby emitting an ink droplet. In the PWM driving technique, various parameters may be modulated for achieving the purpose. One way is to modulate the pre-pulse P1. Another way is to modulate the off-time P2 thereby control the time period during which the thermal energy given by the pre-pulse P1 diffuses over the ink. Otherwise, the main pulse P3 may be modulated so as to control the thermal energy for emitting the ink droplet. Either any single of these parameters or any combination of these parameters may be employed.

In the conventional techniques described above, however, there are conflicts between the techniques for achieving the high operating speed and those for achieving the high quality image.

For example, if the number of printing elements is increased twice so as to increase the printing speed twice, then it is required to increase the number of blocks since there is a limitation in the maximum number of nozzles which can be driven at the same time. If the driving frequency is set to 6 kHz, and if the number of blocks is 8, then a driving period of about 20 $\mu$s can be assigned to each block. However, if there are 16 blocks, only 10 $\mu$s can be assigned to a driving pulse for each block. On the other hand, if the driving frequency is increased twice so as to increase the operating speed, then the driving period becomes half the original period, and thus similar problems occur.

On the other hand, to improve image quality using the PWM technique, it is desirable that the time period assigned for emission of each ink droplet should be as long as possible so that the width of each driving pulse can be long enough. However, this requirement conflicts with the high speed requirement.

It is known in the recent art to achieve a resolution higher than that corresponding to the pitch of printing elements disposed on a print head thereby obtaining high image quality. Also in this technique of expanding the resolution, however, similar problems occur. For example, if the resolution is expanded from 360 dots per inch to 720 dots per inch, it is required to print twice the number of columns over the same printing range. As a result, the pulse width allowed to be assigned to each block decreases to half the original value. On the other hand, it is expected that multi-level printing techniques for modulating the dot size so as to obtain gradation will be important to achieve higher image quality. Also in the multi-level printing techniques, it is desirable that the driving pulse width should be as long as possible.

The technique for improving the image quality is not limited to that in which the pulse width for driving the print head is controlled, and there can be various other techniques for the same purpose. In any case, it is desirable to achieve both a high operating speed and high image quality. This is also true from the viewpoint of stable operation of the print head and the viewpoint of directly controlling the operation of the print head.

In one known technique to achieve both the high operating speed and the high image quality, the number of nozzles which are driven at the same time is increased while nozzles are grouped into blocks in such a manner that a plurality of successive nozzles belong to the same block thereby achieving high image quality in particular associated with the linearity along a column. An example of such a technique will be described in detail below referring to FIG. 3 in which the printing density along the scanning direction of the print head is expanded twice. Reference symbols and numerals are similar to those used in FIG. 1.

In the case where one line of dots is formed along a column denoted by the arrow in FIG. 3, nozzles n1 and n2 are driven when the print head comes to a position 1, and nozzles n3 and n4 are driven when the print head comes to a position 3. Similarly, the remaining couples of nozzles n5, n6, . . . , n16 are driven when the print head comes to positions 5, 7, . . . , 15, respectively so that one line of dots is formed along a vertical line as shown by solid circles in FIG. 3. In this print head, the nozzles n1, n2, n5, n6, n9, n10, n13, and n14 are required to be driven at the same time and thus these nozzles are grouped into the same block. Similarly, the nozzles n3, n4, n7, n8, n11, n12, n15, and n16 are grouped into the other same block so that they are driven at the same time. In this technique, the maximum number of nozzles which are driven at the same time is 8 and a greater number of nozzles are never driven at the same time. Therefore, it is possible to reduce the capacity of the power source and thus reduce the required cost as opposed to the technique in which there is a possibility that all sixteen nozzles are driven at the same time. Although this technique requires the capacity of the power source twice as greater as that of the example shown in FIG. 1, all four dot elements at the upper part of the printing column are formed only by performing printing operations at positions 1 and 3 without having to perform printing operations at positions 2 and 4. In the example shown in FIG. 1, it is required to perform printing four times (when the head comes to the positions 1, 2, 3, and 4) during an operation from a column to an adjacent column. In contrast, in the example shown in FIG. 3, it is required to perform only two printing operations (at the positions 1 and 3). This allows the print head to spend a time twice longer to move from a column to the next column. If the same pulse width is employed in both examples shown in FIG. 1 and 3, the example shown in FIG. 3 can have a driving frequency twice higher than the example shown in FIG. 1. This means that it is possible to increase the number of dots printed per unit time by twice.

In the printing technique shown in FIG. 3, ink droplets are emitted from a plurality of adjacent nozzles at the same time, and therefore the arrival positions of the ink droplets deviate from the vertical printing column by an amount corresponding to the slant of the print head. For example, in the case of a print head having 128 nozzles capable of printing at a resolution of 160 dots per inch by emitting ink droplets through 8 successive nozzles at the same time, ink droplets are emitted every 16 nozzles, and thus the print head is slanted by about 3.5°(=sin$^{-1}$1/16). This angle produces deviations of about 4 $\mu$m (=71 $\mu$m×sin 3.5°) between adjacent nozzles in the direction across the columns. These deviations are so small that they are not perceptible to human eyes.

Therefore, this technique can offer good linearity which is one of factors for achieving high image quality.

However, the printing technique described above have various problems arising from the simultaneous emission of ink through adjacent nozzles. One problem is that bubbling occurs in an incorrect manner, which results in generation of a great number of droplets having a diameter much smaller than that of usual droplets (such droplets having unusually small size are referred to as mist).

In particular, such incorrect bubbling tends to occur when data having a high duty ratio is printed successively. If mist is generated, dirty marks which are perceptible appear on a printing medium. This does not meet the requirement for high image quality.

The incorrect bubbling is due to the following causes.
1. Vibrations of the meniscus surface of nozzles After an ink droplet has been emitted once, if another ink droplet is emitted before a nozzle has been refilled completely with ink, the droplet will be emitted when the meniscus surface is at a position outside the nozzle, and thus incorrect bubbling occurs.
2. Crosstalk between nozzles If the nozzles are not isolated in a proper fashion, ink emission is influenced by adjacent nozzles. The influence between adjacent nozzles associated with ink emission is here referred to as crosstalk. The influence between adjacent nozzles depends on whether ink is emitted from the adjacent nozzles at the same time or at different times. Incorrect bubbling tends to occur when adjacent nozzles are driven at the same time.

As can be seen from the above discussion, it is important to solve the problems of generation of mist to achieve high image quality.

SUMMARY OF THE INVENTION

It is an object of the present invention to solve the above problems. More specifically, it is an object of the present invention to provide a printing technique employing a dot-data shifting technique thereby offering both high image quality and a high operating speed. It is another object of the present invention to provide a printing apparatus using such a printing technique.

As will be described in detail later in reference to specific embodiments, the invention employs a technique based on means for detecting edges of original data to be printed by a printing apparatus and the other area (hereafter referred to as a solid area) and means for shifting an arbitrary raster only in the solid area.

It is known in the art to generate driving blocks (common blocks) at twice the frequency thereby increasing the resolution twice. However, in this technique (the common block shifting proposed by Canon Inc.) all data including edges are shifted block by block (that is every eight nozzles) and thus, in some situations, it is difficult to achieve not only good linearity at edges but also high image quality.

It is also known to perform high-resolution smoothing by shifting a raster to be smoothed in the same direction as that in which the smoothing is performed without increasing the frequency at which the nozzles of the print head are driven. However, this technique (the smoothing technique proposed by Hewlett-Packard Co.) requires a complex process and thus a long processing time. Therefore, the technique does not meet the high-speed requirement. In contrast, in the technique according to the present invention (hereafter referred to as the dot-data shifting technique), good linearity at edges is achieved by shifting only those rasters which are in solid areas. Furthermore, in this technique, it is required to detect only edge and solid areas. As a result, the detection can be performed according to a simple algorithm, and thus it is possible to achieve a high operating speed.

According to this technique of the invention, the generation of mist: can be suppressed without conflicts between the high image quality and the high operating speed. Thus, the dot-data shifting method and the printing apparatus using this method according to the invention have the capability of printing a high quality image at a high speed.

BRIEF DESCRIPTION OF THE DRAWINGS

FIG. 5 is a block diagram illustrating a control unit used to control various members of the printing apparatus;

FIG. 10 is a schematic representation of a process of extracting a solid area from the original data;

FIG. 14 schematically illustrates the resultant data obtained after the dot-data shifting operation;

FIG. 19 is a schematic representation of a dot-data shifting operation according to the embodiment of the invention;

FIG. 22 is a schematic representation of a dot-data shifting operation according to the embodiment of the invention.

DESCRIPTION OF THE PREFERRED EMBODIMENTS

The present invention will be described in further detail below referring to specific embodiments in connection with the accompanying drawings.

Figure 4:
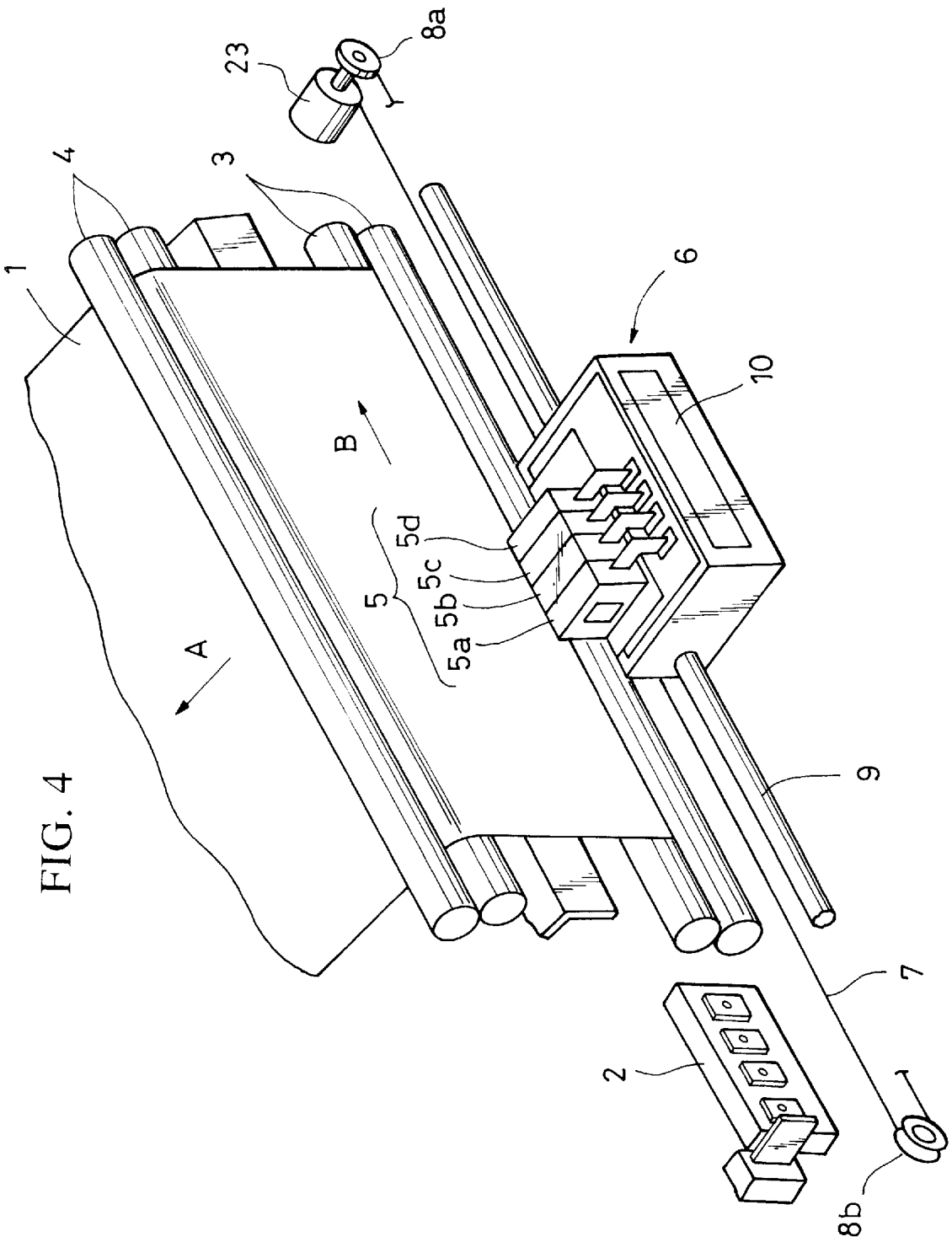
FIG. 4 is a perspective view of a printing apparatus.

FIG. 4 is a perspective view of a printing apparatus of the ink-jet type according to the present invention. First, the general structure of the printing apparatus will be described. In FIG. 4, reference numeral 1 denotes a printing sheet such as paper or a plastic sheet. A plurality of printing sheets are placed in an one-on-another fashion on a sheet feeder unit such as a cassette, and a sheet is fed one by one from the sheet feeder unit into the printing apparatus via feeding rollers (not shown). The printing sheet 1 is carried in a direction denoted by the arrow A in FIG. 4 by a first pair of carrying rollers 3 and a second pair of carrying roller 4 wherein the first and second paris of carrying rollers are disposed at locations a predetermined distance apart from each other and these rollers are separately driven by individual stepping motors (not shown).

Reference numeral 5 denotes a print head of the ink-jet type by which an image is formed on the printing sheet 1. Ink is supplied from an ink cartridge (not shown) and is emitted through nozzles disposed on the printing head by driving emitting means according to an image signal. In the present embodiment, the print head 5 and the ink cartridge are mounted on a carriage 6. The carriage 6 is connected to a carriage motor 23 via a belt 7 and pulleys 8a and 8b. The carriage 6 is driven by the carriage motor 23 so that the carriage 6 moves along a guide shaft 9 in both directions.

In response to the image signal, ink is emitted against the printing sheet 1 from the print head 5 moving in a direction denoted by the arrow B in FIG. 4 thereby forming an image on the printing sheet 1. The print head 5 returns to a home position as required, and a recovery operation is performed there by an ink recovery mechanism 2 so that the emitting conditions such as blocking of the nozzles are recovered. The printing sheet 1 is moved by the pairs of carrying rollers 3 and 4 in the direction denoted by the arrow A by an amount corresponding to one line at a time. The printing and paper carrying operations are performed repeatedly until printing has been performed over the entire area of the printing sheet 1. The individual members of the printing apparatus are controlled by a control system as described below.

As shown in FIG. 5, the control system includes a control unit 20 including a CPU such as a microprocessor 20a, a ROM 20b for storing a control program and various data used by the CPU 20a, and a RAM 20c used as a work area for the CPU 20a and also used to temporarily store various data. The control system further includes an interface 21, a control panel 22, the carriage motor 23 for driving the carriage, a motor for driving a paper feeding roller (paper feeding motor) 24, a motor for driving the first pair of carrying rollers (first carrying motor) 25, a motor for driving the second pair of carrying rollers (second carrying motor) 26, a driver 27 for driving these four motors, and a driver 28 for driving the print head.

The print head 5 includes a temperature sensor 30 by which the temperature inside the print head 5 is always monitored. The print head 5 is connected to a controller disposed in the interface 21 via a control line 51 and a data line 52. The information of the temperature detected by the temperature sensor 30 is sent to the controller via a signal line 53 and further to the control unit 20. The controller controls the printing operation of the print head 5 by sending a control signal to the print head 5 via the control line. The temperature information is used by the control unit 20 to control the printing operation of the print head 5.

The control unit 20 receives various information (associated with for example the character pitch and character type) from the control panel 22 via the interface 21 and also receives an image signal from an external device 29 via the interface 21. Furthermore, the control unit 20 outputs an ON and OFF signals to the motors 23 to 26 via the interface 21 thereby controlling the operation of the motors 23 to 26. The control unit 20 also controls each printing elements according to an image signal.

In the present embodiment, the print head has 16 nozzles which are grouped into blocks and driven at a 6.25 kHz thereby achieving a resolution of 360 dots per inch.

Figure 6A:
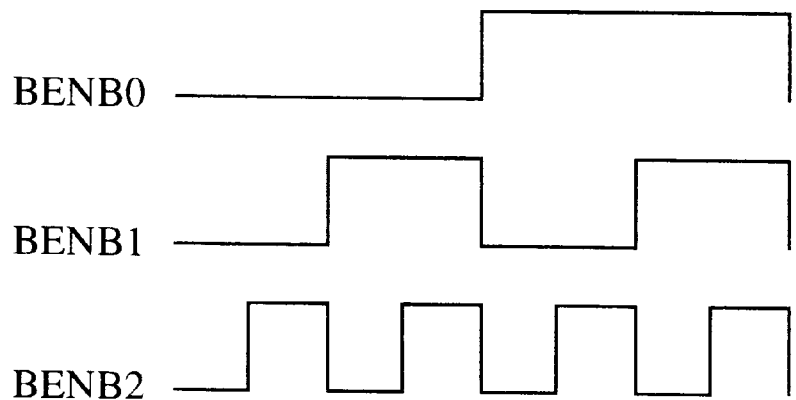
FIGS. 6A and 6B A–E diagrams illustrating an example of block selection signal used to group printing elements of a print head into a plurality of blocks.
Figure 6B:
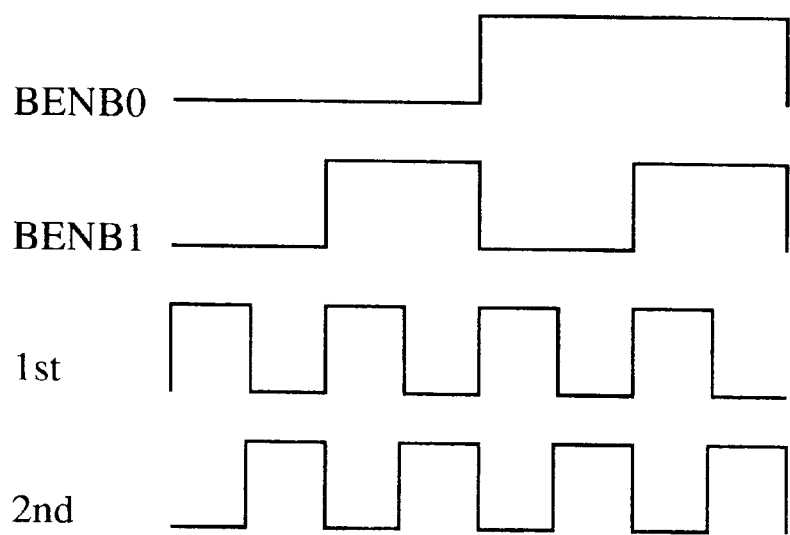

In the case where the nozzles are grouped into 8 blocks, 3-bit information such as that shown in FIG. 6A is sent from the main part of the printing apparatus to the print head. In the print head, the 3-bit information is decoded into a signal having one of eight values from 0 to 7 by which the blocks are selected. Alternatively, 2-bit information may be sent from the main part of the printing apparatus to the print head as shown in FIG. 6B, and the 2-bit information is decoded into a signal having one of four values from 0 to 3, which is divided further in response to a plurality of signals (two signals, in this example) thereby selecting blocks. In this example, there are provided a plurality of signal lines by which the number of blocks can be set to a desired value.

The control technique for redividing the blocks by sending a signal via the signal lines thereby increasing the number of blocks will be described in further detail below.

Figure 7:
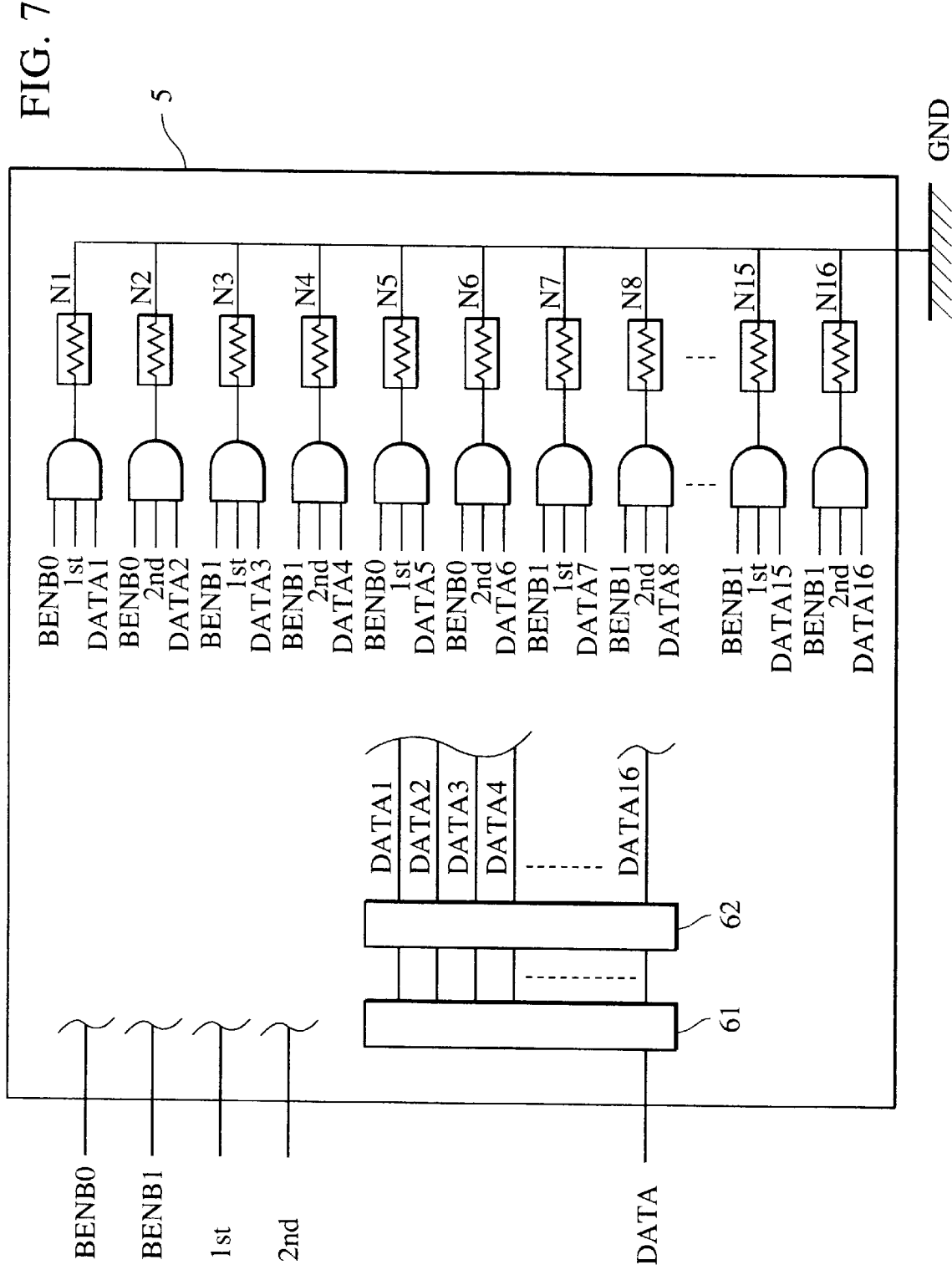
FIG. 7 is a block diagram of a logic circuit for driving the print head.

FIG. 7 is a block diagram illustrating a logic circuit for driving the print head.

In FIG. 7, reference numeral 61 denotes a shift register, and reference numeral 62 denotes a latch. There are provided printing elements N1 to N16 corresponding to the nozzles, which serve as emission heaters for applying thermal energy to ink.

When all three signals, including a block signal (either BENB0 or BENB1) for selecting a block, a block redividing signal (either 1st or 2nd) for redividing each block, and a data signal (one of sixteen lines DATA1, DATA2, . . . , DATA16) carrying image data, are at a high level, a current is passed through the corresponding printing elements (N1 to N16). The data signals (DATA1, DATA2, . . . , DATA16) are given from the control unit of the printing apparatus to the shift register of the print head via the driver 28, and then latched by the latch. The data signals are then supplied to one input of each AND gate connected to the respective heaters N1 to N16. The block signals (BENB0/BENB1) and the block redividing signals (1st/2nd) are supplied from the controller via the control line.

In the printing apparatus, as will be described in detail below, printing is performed by means of the dot-data shifting technique which is an essential part of the present invention. In this specific embodiment, it is assumed that the print head capable of printing at a resolution of 360 dots per inch is used to achieve a double resolution in the scanning direction of the print head.

First Embodiment

A first embodiment of the invention will be described in detail below.

Figure 8:
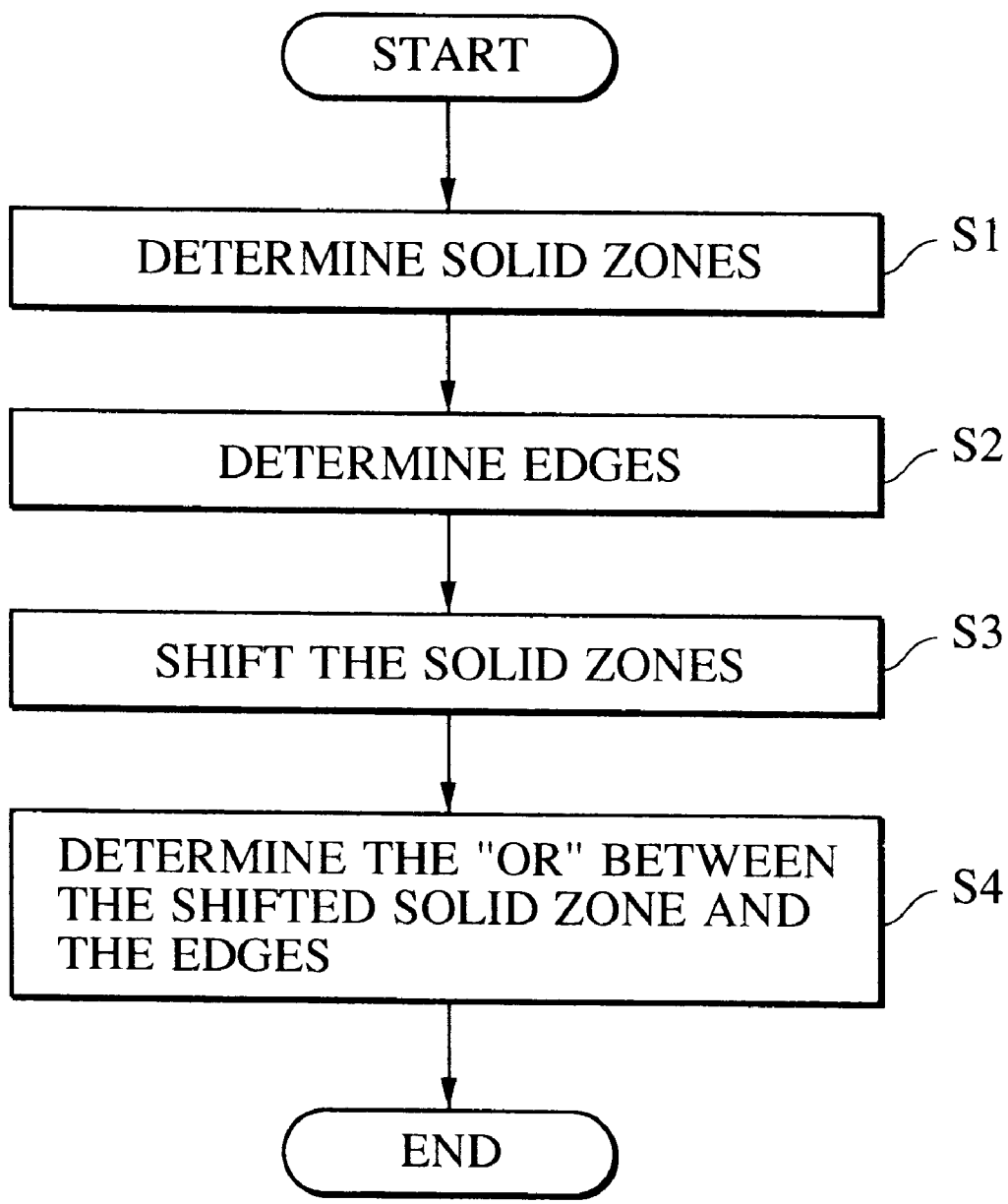
FIG. 8 is a flow chart illustrating a dot-data shifting process according to the present invention.

FIG. 8 is a flow chart illustrating a sequence of processes according to the present embodiment of the invention.

Figure 9:
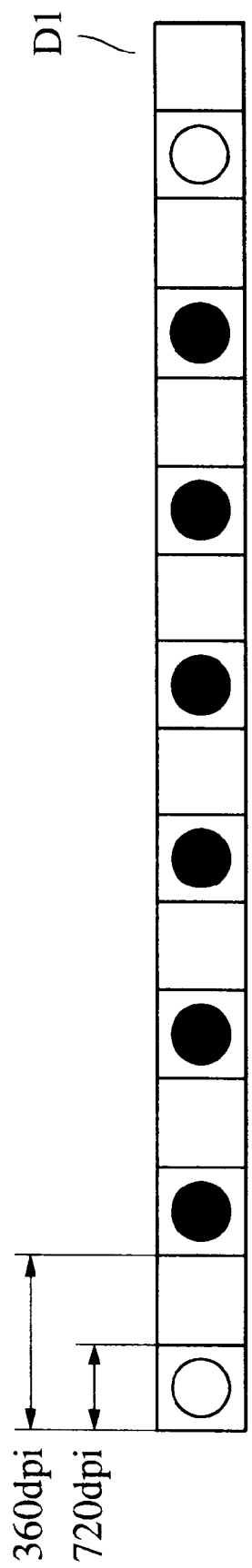
FIG. 9 illustrates original data in a raster under consideration.
Figure 11:
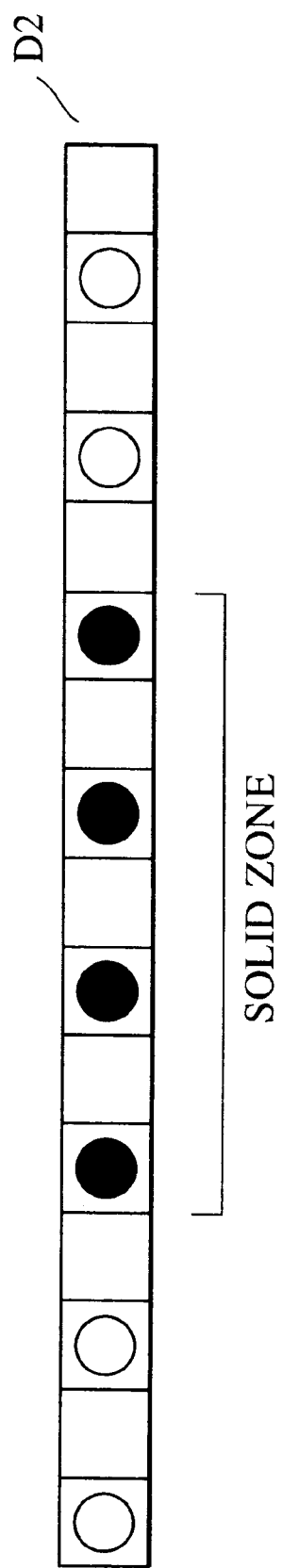
FIG. 11 illustrates the solid area extracted from the original data.

In a first step S1, solid zones of a raster of the original data to be printed are extracted. The data includes dots which can be present only at positions corresponding to the resolution of 360 dots per inch as shown in FIG. 9. Each dot of the original data D1 is subjected to an AND operation with respect to the dots at both sides of the dot under consideration as shown in FIG. 10. The AND operation is performed only on those dots at locations corresponding to the resolution of 360 dots per inch. If a dot under consideration has a dot to be printed at its both sides, the dot is regarded as belonging to a solid zone. Thus, the solid zone of the original data D1 shown in FIG. 9 is extracted as shown in FIG. 11.

Figure 12:
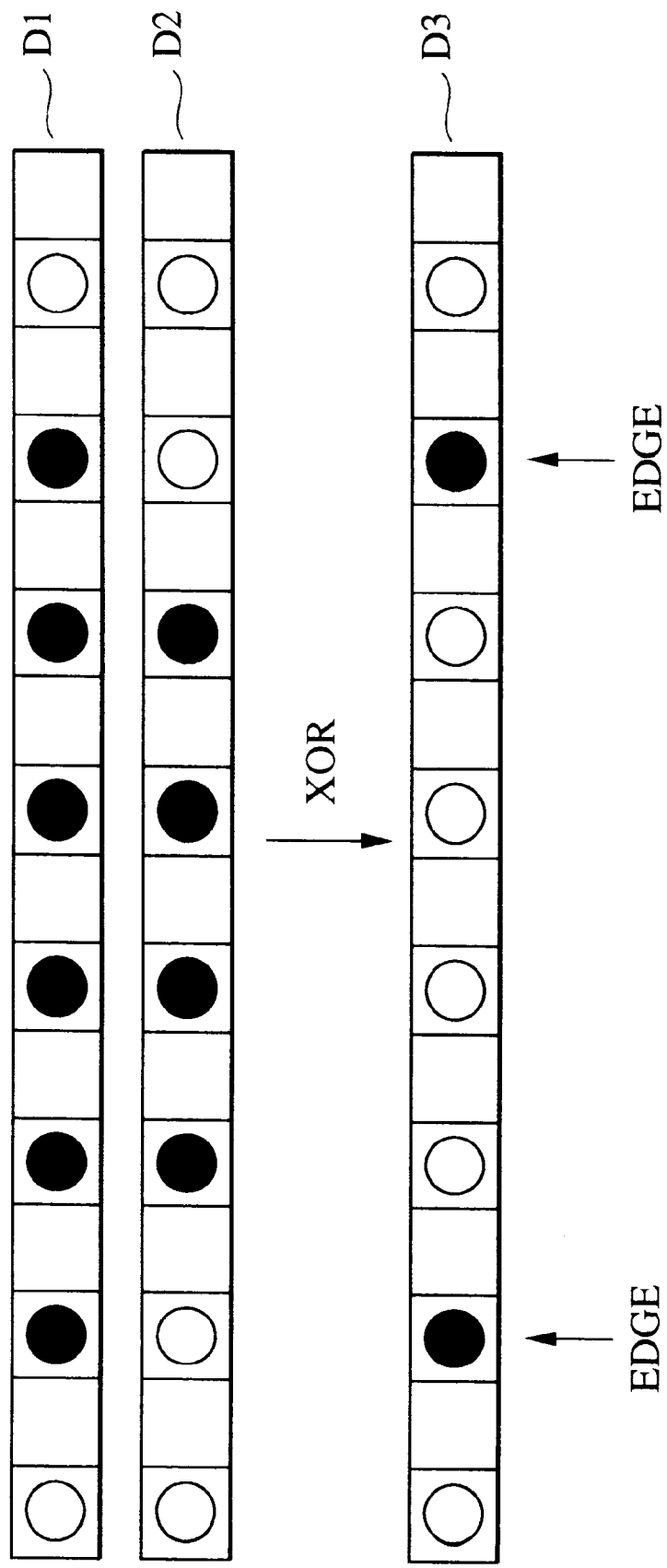
FIG. 12 illustrates the edges produced from the original data and the solid area.
Figure 13:
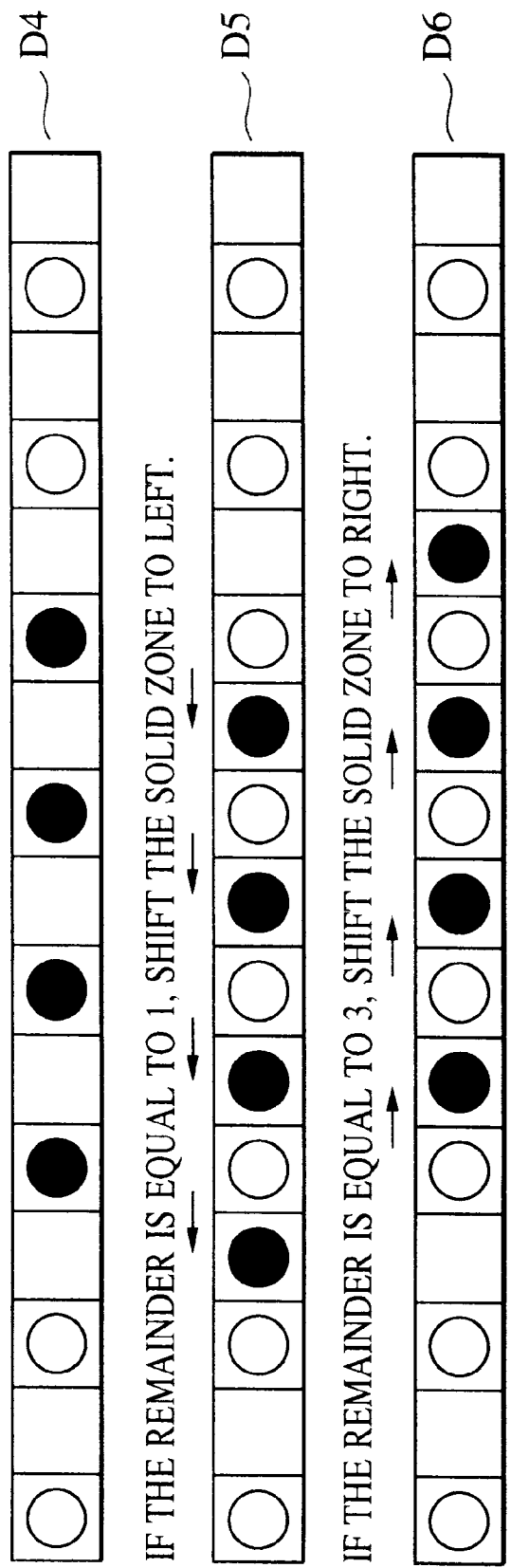
FIG. 13 is a schematic representation of a dot-data shifting operation.

In step S2, edges of an image is detected. The X0R (exclusive OR) between the original data D1 and the data D2 representing the solid zone extracted in step S1 is calculated thereby extracting the edges as shown in FIG. 12. The data representing the extracted edges is referred to as D3. In step S3, z the data of the solid zone is shifted by an amount corresponding to a dot-to-dot pitch of a resolution of 720 dots per inch either to right or to left depending on the vertical position of a raster under consideration as shown in FIG. 13. The specific direction in which the specific raster is shifted is determined on the basis of the remainder obtained when dividing the vertical position of the raster under consideration by 4. For example, the determination of the shifting direction is performed as follows.

When the remainder is equal to 0 or 2, no shifting operation is performed.

When the remainder is equal to 1, the raster is shifted to left (right).

When the remainder is equal to 3, the raster is shifted to right (left).

Alternatively, when the remainder obtained when dividing the vertical position of the raster under consideration is odd, the raster is not shifted while the raster is shifted in an either direction when the remainder is even. Furthermore, the shifting directions may be inverted. As a result of the above-described shifting operation on the solid data, the solid zone along one scanning line of the image comes to have a resolution of 720 dots per inch.

In the final step S4, the OR between the edge data D3 shown in FIG. 12 and the solid zone shown in FIG. 13 is calculated thereby obtaining the final data D7, D8, and D9 to be used in the printing operation as shown in FIG. 14.

In the present embodiment, the shifting of a raster of data may be performed for example using a buffer memory having a capacity large enough to store dot data obtained when scanning the print head at 720 dots per inch.

Figure 15A:
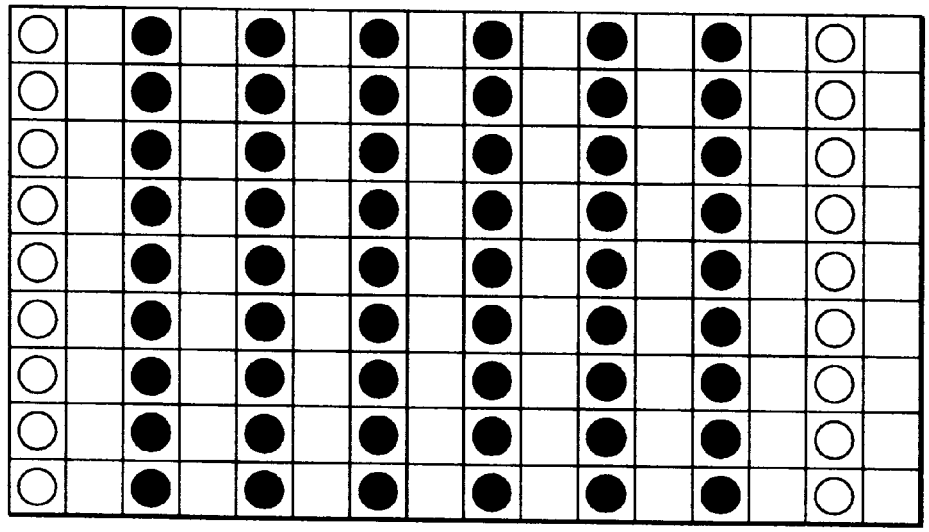
FIGS. 15A and 15B illustrate a specific example of an image formed according to the data subjected to the dot-data shifting.
Figure 15B:
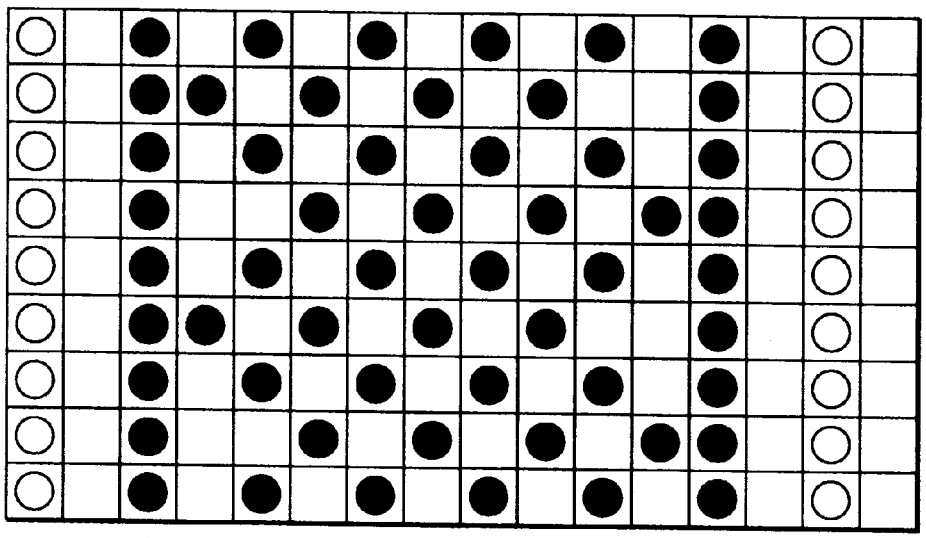

FIG. 15 illustrates an example of an operation of partially shifting data to be printed according to the present embodiment of the invention, wherein FIG. 15A illustrates original data, and FIG. 15B illustrates the data obtained by shifting the data shown in FIG. 15A.

The printing operation of the data shown in FIG. 15B will be described below.

The given original data D1 has a resolution of 360 dots per inch. Thus, the data shown in FIG. 15A includes dots located only at positions corresponding to the resolution of 360 dots per inch. On the other hand, the data shown in FIG. 15B obtained after the shifting operation according to the embodiment of the invention includes dots located at positions corresponding to a double density in the direction across the columns. The data shown in FIG. 15B is printed as follows. First, the print head is scanned so that dots are formed at odd columns at a resolution of 30 dots per inch. Then in another second scanning operation following that, dots are formed at even columns so that the printed positions are shifted from the positions of the dots formed in the previous scanning by an amount corresponding to the dot pitch of the resolution of 720 dots per inch. The scanning operations for forming dots at odd columns and even columns may be performed either in the same direction, or in opposite directions using a printing apparatus adapted to perform a printing operation in both scanning directions. Furthermore, the dots at even columns may be formed first, and then the dots at odd columns may be formed, as opposed to the above example. Otherwise, all dots may be formed during one scanning operation of the print head. Dots which are not shifted are printed at a resolution of 360 dots per inch. Even in the case of dots in an area subjected to a dot-data shifting operation, the great majority of them are printed at a resolution of 360 dots per inch. As can be seen from FIG. 15B, dots are formed at adjacent even and odd columns only at edges in particular rasters. In the example shown in FIG. 15B, such adjacent dots are formed at either edge in each even rasters. When the data shown in FIG. 15B is regarded as having a resolution of 720 dots per inch, adjacent dots are present at a minority of locations. Therefore, ink can be emitted at right times without a delay. Even if refilling of ink into a nozzle is delayed in a printing operation for some adjacent dots, such the failed dots will be inconspicuous since those adjacent dots are in a solid area and thus those failed dots will not have a significant influence on the image quality. Not only in the ink-jet printer but also in other types of printers, if printing elements are driven successively during a short time, the image quality can be degraded. However, adjacent dots are printed at a minority of locations at edge parts, and thus the degradation in the image quality is not significant and cannot be easily recognized. In addition to the ink-jet technique, a thermal printing technique is also used in the art. In this technique, thermal energy is applied to an ink sheet using a heating element thereby transferring ink onto a printing medium. Also in this thermal printing technique, a successive operation of the same printing element will result in a problem that the printing element is excessively heated. However, if the present invention is applied to the thermal printing technique, successive operations are limited to a minority of locations at edges, and thus no significant problems occur.

In the embodiment described above, dots are printed at a constant scanning speed. Alternatively, the scanning speed of the print head may be reduced as required. In this case, ink can be refilled without delay even at adjacent dots. This results in a stable ink emitting operation and thus it is possible to further improve the image quality.

Figure 1:
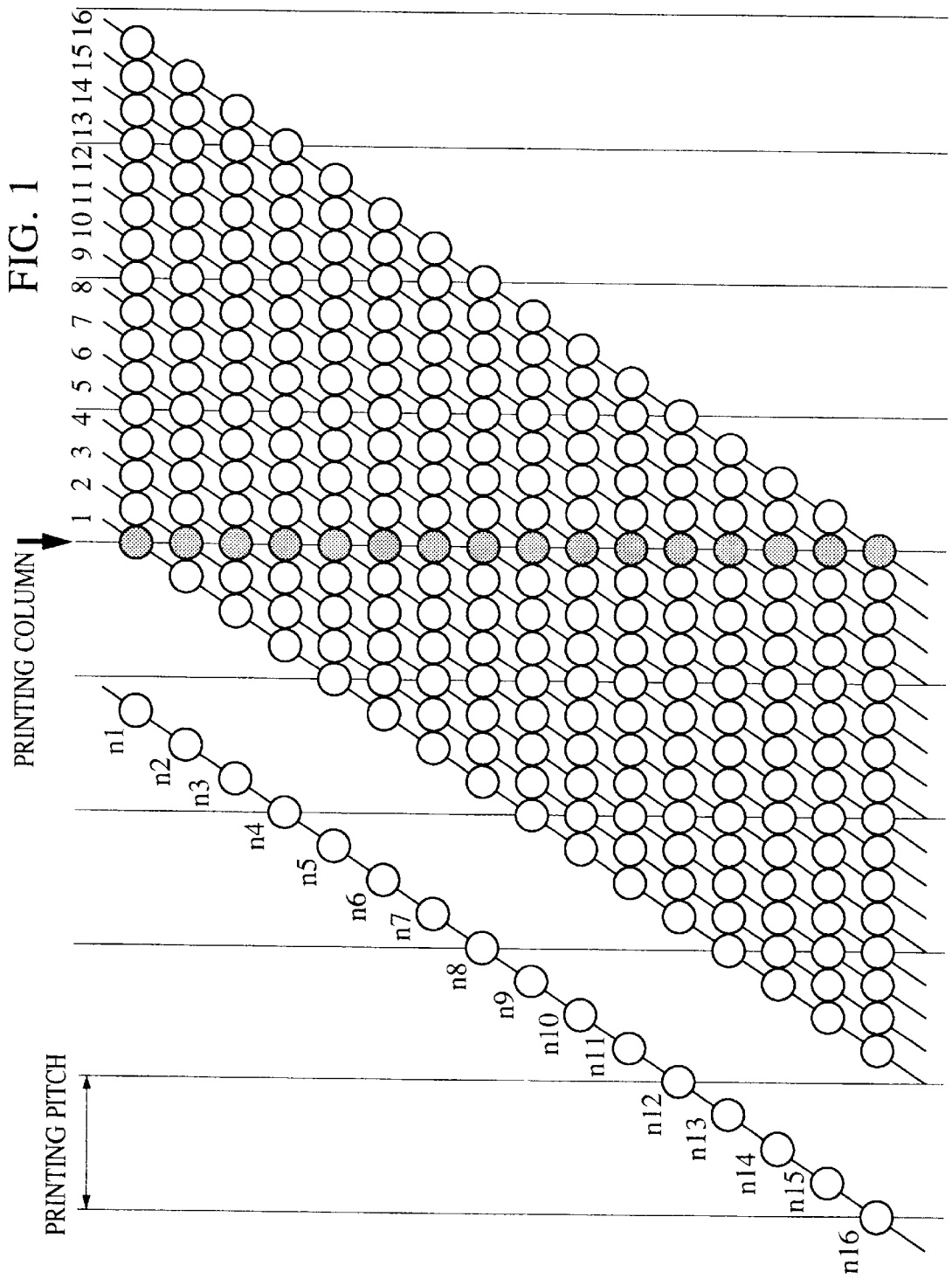
FIG. 1 is a schematic representation of a block driving control associated with a print head.
Figure 2:
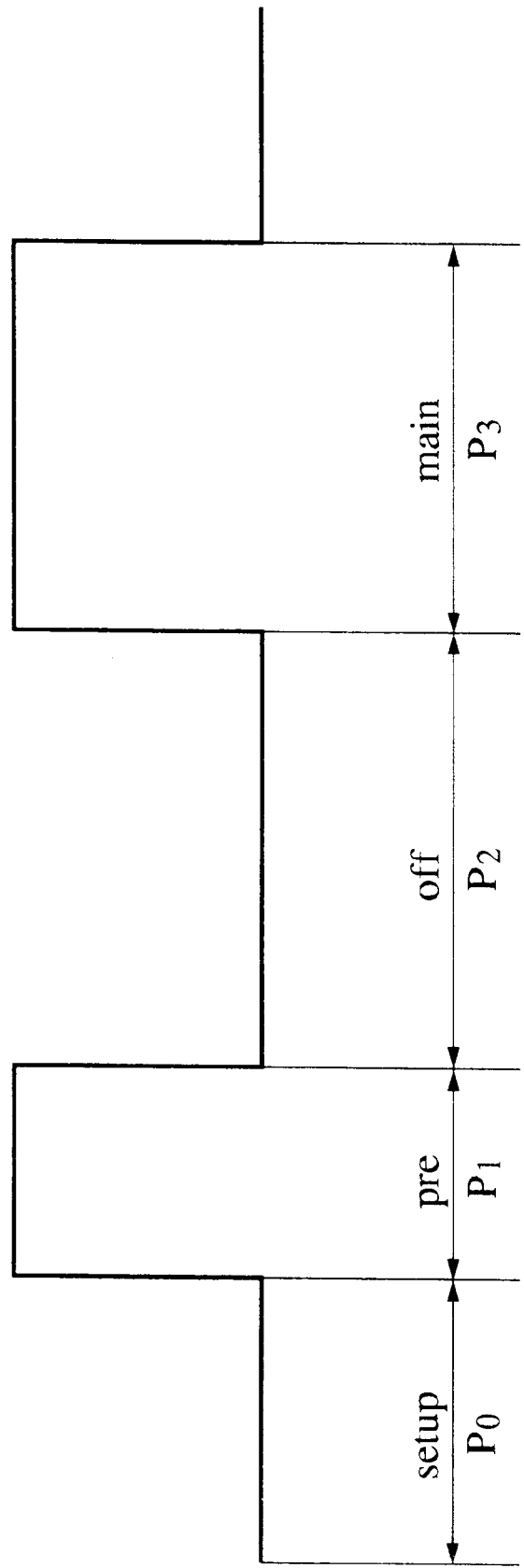
FIG. 2 is an example of a driving pulse used to form one dot or a unit element of an image.
Figure 3:
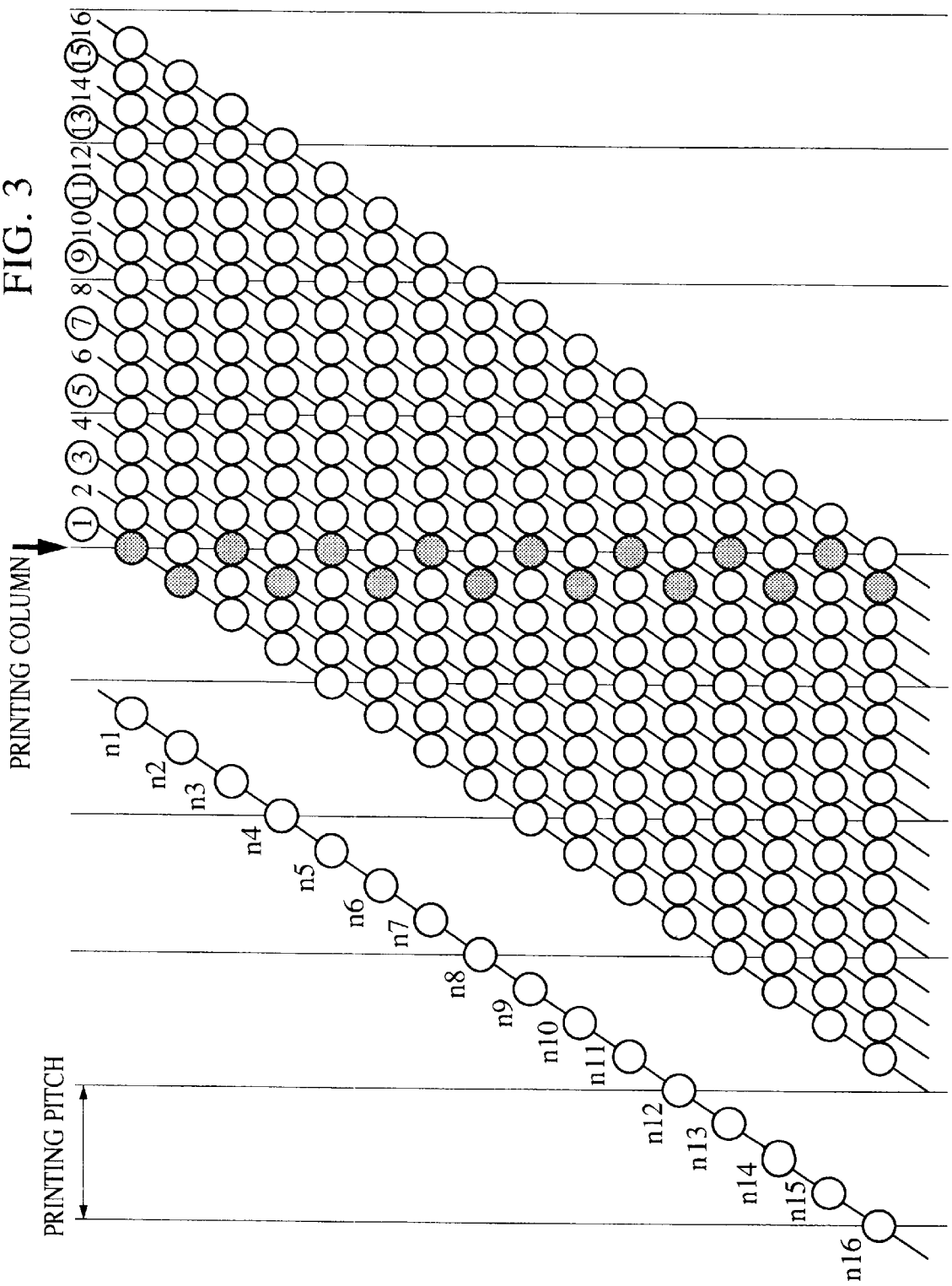
FIG. 3 is a schematic representation of a block driving control for emitting a plurality of adjacent nozzles at the same time at a high frequency.

In the example shown in FIG. 15B, dots directly adjacent in the direction across the columns are located only at edges of a solid area. This means that even in the printing technique described earlier in connection with FIG. 3 in which adjacent nozzles are driven at the same time to emit ink, the generation of mist is suppressed since adjacent dots are present only at edges. Furthermore, since the edges are the same as the original data, no degradation in the image quality occurs at edge portions. In particular, high quality can be obtained in printing characters.

In the present embodiment, as described above, adjacent nozzles are driven at the same time at edge portions of an image as shown in FIG. 15B. However, such an operation for adjacent nozzles is performed only for a very short time and is not performed successively, and thus the operation will not result in generation of mist. Furthermore, a plurality of dots can be formed at the same time without causing generation of mist.

Furthermore in the embodiment described above, each edge portion is formed with one dot. The present invention is also effective in the case where each edge portion is formed with a plurality of dots. In this case, the operation can be performed according to a sequence similar to that shown in FIG. 8 except that it is required to perform a greater number of AND operations to extract a solid zone. If edge portions are formed with a plurality of dots, the edges are emphasized and thus sharp and clear images can be obtained, especially in characters and line drawings In the present embodiment, as described above, adjacent nozzles in the series of nozzles disposed on the print head are driven at the same time thereby achieving an operation at an increased driving frequency or at an increased speed.

Furthermore, dot-data shifting performed on the data to be printed prevents the generation of mist. Thus, the dot-data shifting technique according to the present invention and the printing apparatus using this dot-data shifting technique make it possible to print a high-quality image at a high speed.

Furthermore, in this invention, the operation described above may be controlled either by the CPU installed in the printing apparatus itself or by a host system such as a personal computer connected to the printing apparatus. In the case where the operation is controlled by the host system or the like, the control may be performed by software designed to control the printing apparatus such as a printer driver Second Embodiment Now, a second embodiment of the invention will be described in detail below.

In this second embodiment of the invention, the dot-data shifting technique is applied to a particular color.

In color images, the brightness of black is influenced most significantly of all colors by generation of mist. Taking this fact into account, the present embodiment performs a dot-data shifting only on black data.

Figure 16:
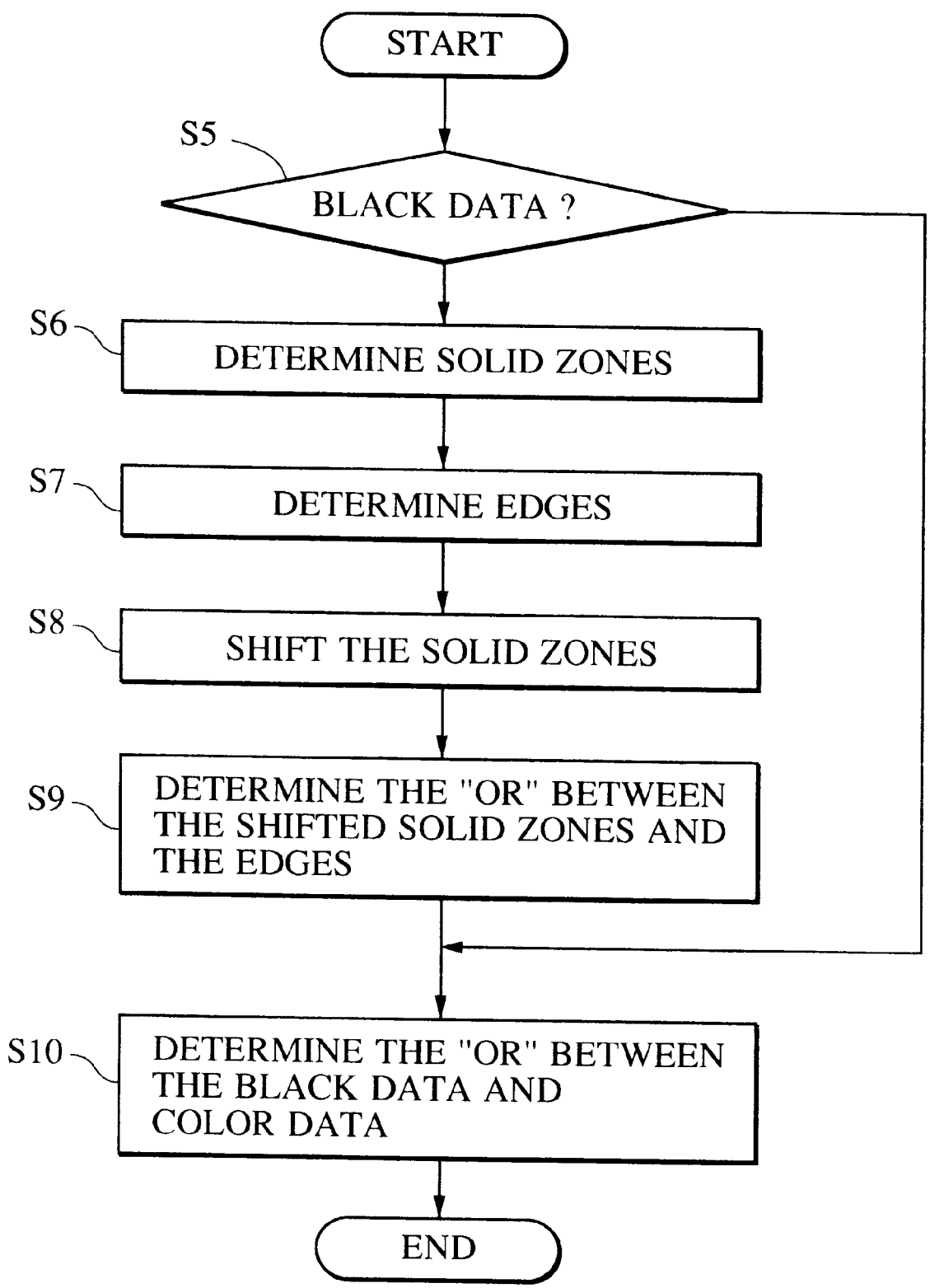
FIG. 16 is a flow chart illustrating a sequence of processes according to a second embodiment of the invention.

The embodiment will be described in detail below referring to FIG. 16. In step S5, it is determined whether the data to be printed is black or not. If the data is of a color other than black, then the process goes to step S10. If the data is black data, the process goes to step S6 in which a raster of the original data to be printed is examined so as to detect a solid zone as in the first embodiment. Each dot of the original data is subjected to an AND operation with respect to the dots at both right and left sides of the dot under consideration thereby extracting a solid zone. In step S7, edges are detected. The X0R between the original data and the solid zone is then calculated thereby extracting edges. In step S8, the data of the solid zone is shifted by an amount corresponding to a dot-to-dot pitch of a resolution of 720 dots per inch either to right or to left depending on the vertical position of a raster under consideration thereby generating new data representing the solid area so that particular rasters are shifted in particular directions. In step S9, the OR between the solid zone and edges is calculated thereby obtaining black data to be employed in a printing operation. In step S10, the OR between the black data and color data is calculated so as to generate a final printing data.

In the present embodiment, as described above, a great reduction in the processing time can be achieved only by making a slight modification on the sequence employed in the previous embodiment described above so that dot-data shifting is performed only on black data which is most easily affected by mist. The other parts of the operation and structure are the same as those in the first embodiment, and thus these are not described here.

Third Embodiment

Now, a third embodiment of the invention will be described in detail below.

In this third embodiment of the invention, the dot-data shifting is performed depending on the duty ratio of data to be printed.

As described above, mist is generated when simultaneous ink emission through a plurality of adjacent nozzles is performed successively. This means that the degree of the generation of mist depends on the length of successive dots in the data to be printed.

Figure 17:
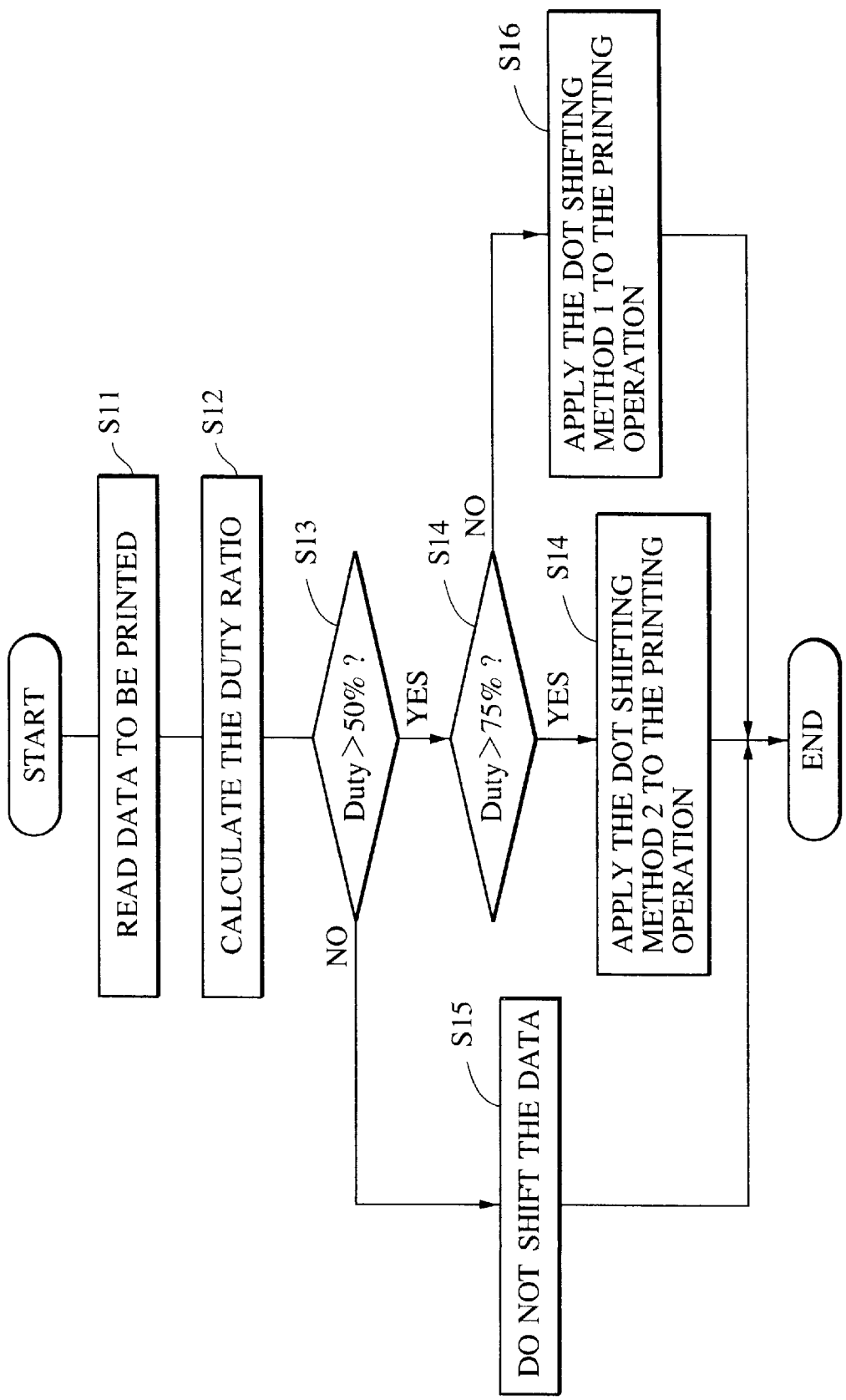
FIG. 17 is a flow chart illustrating a sequence of processes according to a third embodiment of the invention.

In the present embodiment, therefore, the dot-data shifting is performed depending on the duty ratio of the data to be printed or otherwise the dot-data shifting is performed in different manners depending on the duty ratio of the data. FIG. 17 illustrate an example of a sequence of the operation according to the present embodiment.

In a first step S11 in the flow chart of FIG. 17, data to be printed is read. In this reading process, a plurality of rasters of data are read at a time, wherein the amount of data read at a time is limited by the capacity of a storage device such as a RAM used to store the data read. In step S12, the dots to be printed are counted so as to calculate the duty ratio of the data. The term "duty" is used here to refer to the density of dots in an area to be printed relative to the maximum possible number of dot elements in the area. The dot-data shifting method applied to the data is selected depending on the duty ratio. The calculation of the duty ratio may be performed either for the plurality of rasters or for solid areas in the plurality of rasters. In step S13, it is judged whether the duty ratio is greater than 50%. If no, then the process goes to step S15. In this case, shifting is not performed. If it is concluded in step S13 that the duty ratio is greater than 50%, the process goes to step S14 in which it is judged further whether the duty ratio is greater than 75%. If it is concluded in step S14 that the duty ratio is less than 75%, the process goes to step S16 in which the dot-data shifting method 1 is selected. On the other hand, if it is concluded in step S14 that the duty ratio is greater than 75%, the process goes to step S17. In step S17, the dot-data shifting method 2 is selected, and the sequence of the process is completed.

The way in which dot data is shifted is similar to that employed in the first embodiment described above except that the number of rasters which are subjected to the shifting operation is changed depending on the duty ratio in such a manner that 1/4 of the rasters are shifted in the dot-data shifting method 1 while 2/4 of the rasters are shifted in the dot-data shifting method 2. In this technique, the dot-data shifting is performed according to the selected method optimum for the duty ratio of the data to be printed without having to perform a shifting operation on data which needs no shifting operation.

In the specific embodiment described above, the dot-data shifting method is selected depending on which of three ranges (less than 50%, from 50% to 75%, greater than 75%) the duty ratio falls in. However, the boundaries of the ranges may be set to other proper values. Furthermore, the dot-data shifting method may be selected depending on which of a greater number of ranges the duty ratio falls in.

In the present embodiment, which can be obtained by slightly modifying the sequence employed in the first embodiment described above, the dot-data shifting method is selected depending on the duty ratio of the data to be printed thereby optimizing the dot-data shifting operation and thus reducing the process time. The other parts of the operation and structure are the same as those in the previous embodiments, and thus these are not described here.

Fourth Embodiment

A fourth embodiment of the invention will be described in detail below.

In this fourth embodiment, the dot-data shifting is performed in a manner different from the previous embodiments.

In the example of the shifted data shown in FIG. 15, the fourth (counted from the top) raster has two spaces between the left edge and the dot next to the edge. Under certain conditions associated with a printing medium on which the data is printed, the print head, etc., there is a possibility that such the spaces are recognized as missing dots.

To avoid the above problem, the present embodiment employs a dot-data shifting technique in which shifting is performed in both directions.

Figure 18:
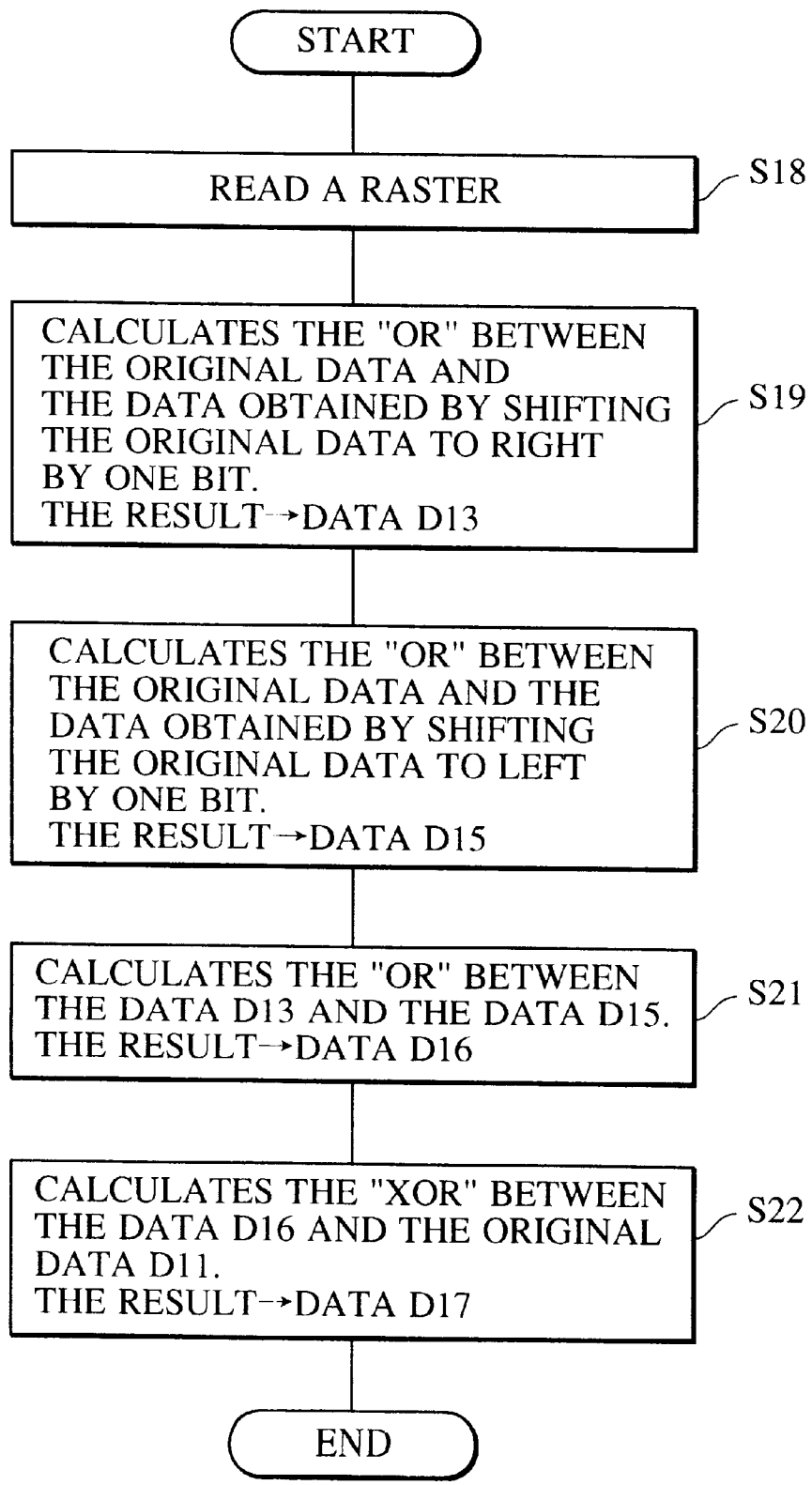
FIG. 18 is a flow chart illustrating a sequence of processes according to another embodiment of the invention.

The sequence of processes of the present embodiment is similar to that shown in FIG. 8 described above in connection with the first embodiment. Therefore, the only different processes will be described herein below. According to the sequence of processes shown in FIG. 18, rasters of data in the extracted solid area are selected and are subjected to a dot-data shifting operation. FIG. 19 illustrates an example of a series of dots.

In step S18, a raster of data to be shifted is read. In step S19, the OR between the original data D11 and the data D12 obtained by shifting the addresses of the original data to right by one bit is calculated so as to produce data D13. In step S20, the OR between the original data D11 and the data D14 obtained by shifting the addresses of the original data D11 to left by one bit is calculated so as to produce data D15. Then in step S20, the OR between the data D13 and the data D15 is calculated so as to produce data D16. Furthermore, the X0R (exclusive OR) between the data D16 and the original data D11 is calculated so as to produce data D17, which is final data representing the shifted dots, and thus the sequence is completed.

Figure 20A:
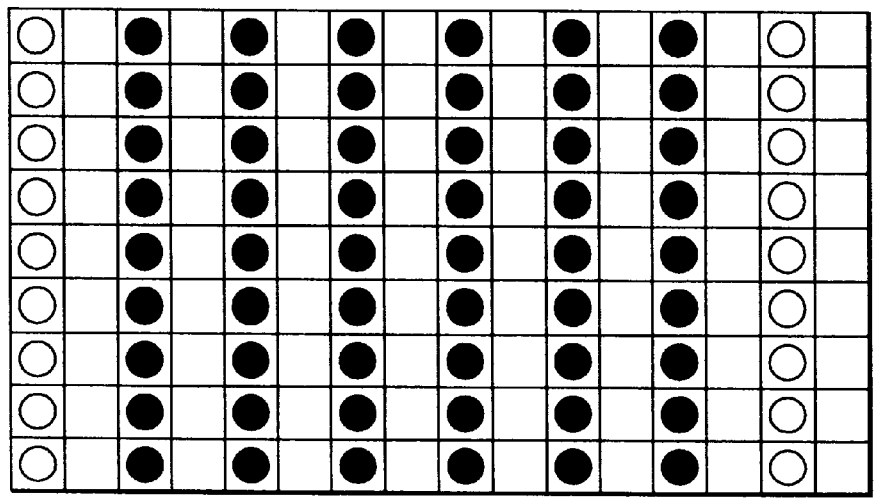
FIGS. 20A and 20B illustrate a specific example of an image formed using the data subjected to the dot-data shifting according to the embodiment of the invention.
Figure 20B:
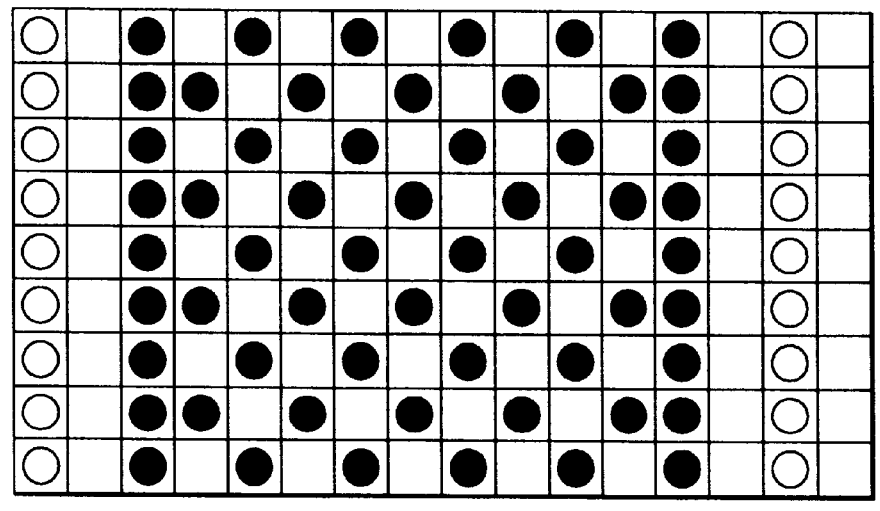
Figure 21:
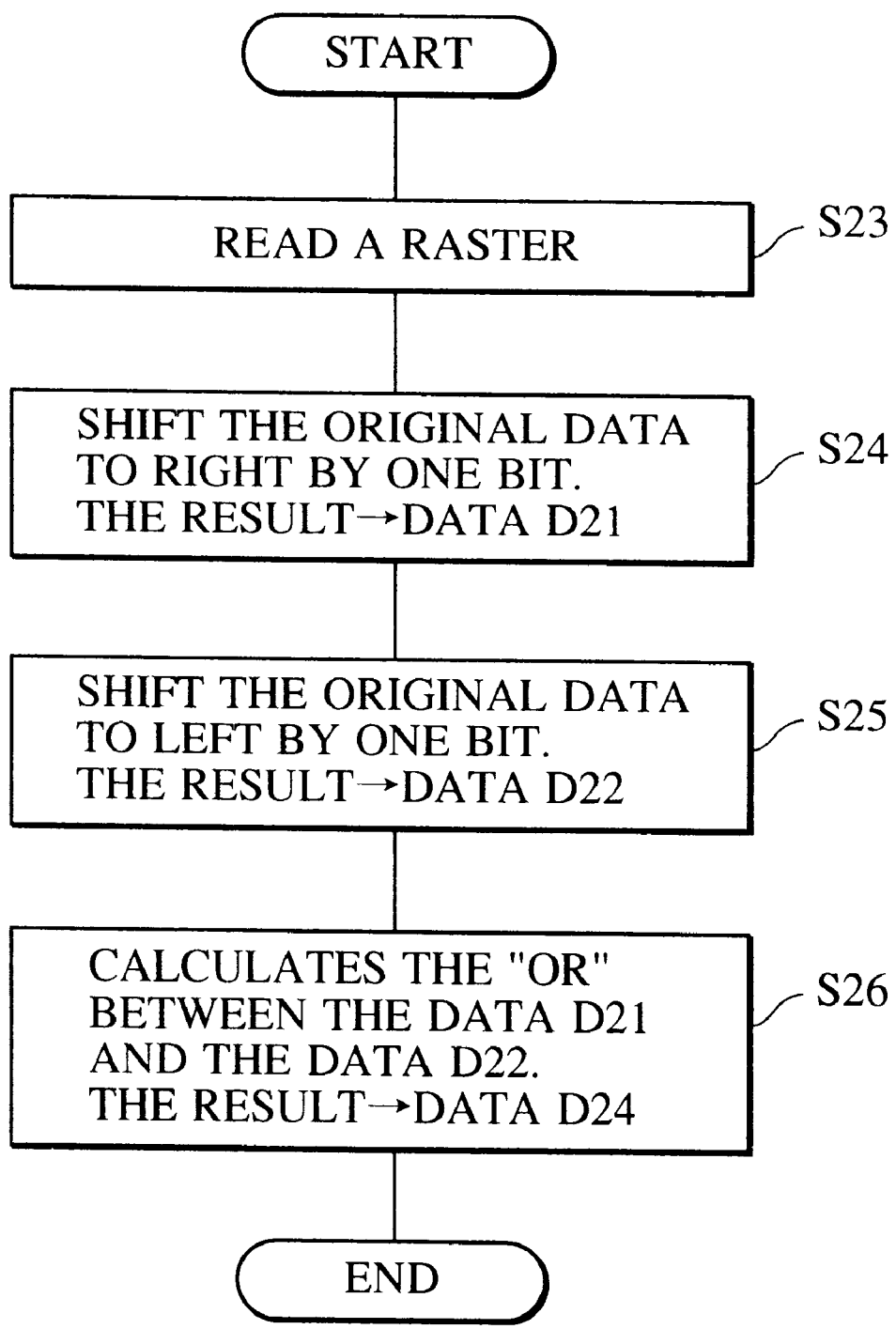
FIG. 21 is a flow chart illustrating a sequence of processes according to still another embodiment of the invention.

FIG. 20 is a schematic representation of an operation for partially shifting the data to be printed according to the present embodiment, wherein FIG. 20A illustrates original data and FIG. 20B illustrates the resultant data after being shifted. In the example shown in FIG. 20B, dots directly adjacent in the direction across the columns are located only at edges of solid area, and no successive dots are present in the other area. Furthermore, there are no spaces including two or more dots along a raster. FIG. 21 illustrates an alternative sequence of processes for the same purpose, which includes a less number of steps.

In step S23, a raster of original data D11 to be shifted is read. In step S24, data D21 is created by shifting the addresses of the original data D11 to right by one bit. Then in step S25, data D22 is created by shifting the addresses of the original data D11 to left by one bit. Furthermore in step S26, the OR between the data D21 and the data D22 is calculated thereby creating data D24 which is final data representing the shifted dots.

As described above, the sequence of processes according to the present embodiment of the invention prevents the generation of spaces which can be recognized as missing dots. The other parts of the operation and structure are the same as those in the previous embodiments, and thus these are not described here.

In the present embodiment, as described above, the dot-shifting operation is performed evenly in both directions thereby solving the problem such as that shown in FIG. 15 in which spaces which can be recognized as missing dots are present at the left edge in the fourth raster.

Other Embodiments

In the previous embodiments described above, the edges and the solid areas are detected from the original data to be printed. Alternatively, only edges of a printing area may be detected, and the remaining part of the printing area to be printed may be regarded as a solid area. In this case, the edges may be detected by detecting a transition from a non-printing area to a printing area or a transition from a printing area to a non-printing area, which is rather easy to perform.

The technique is especially useful in printing apparatus equipped with a print head of the particular ink-jet type in which an ink droplet is emitted by means of thermal energy.

Such the ink-jet print head may preferably be implemented for example according to the basic principle and a typical structure disclosed in U.S. Pat. Nos. 4,723,129 or 4,740,796. Although this technique may be applied either to the on-demand type or to the continuous type, the technique is useful especially in the on-demand type in which at least one driving signal according to information to be printed is applied to electro-thermal conversion elements disposed at locations corresponding to a sheet holding liquid (ink) or liquid paths so that the electro-thermal conversion elements generate heat which causes a rapid temperature increase exceeding the nuclear boiling temperature, which in turn creates film boiling at a heating surface of the print head, thereby generating a bubble in the liquid (ink) in exact response to the driving signal. As a result of the growth and shrinkage described above, at least one droplet of liquid (ink) is emitted through an emission opening. If a signal in a pulse form is employed as the driving signal, it is possible to achieve quick growth and shrinkage of a bubble and thus it is possible to achieve good response in emission of an ink droplet. It is preferable to apply a pulse driving signal in a manner for example disclosed in U.S. Pat. Nos. 4,463,359 or 4,345,262. Furthermore, it is preferable to perform the above heating so that the temperature of the heating surface rises at a rate such as that disclosed in U.S. Pat. No. 4,313,124.

A print head having a structure of combination of an emission opening, liquid path (straight-line liquid path or right-angle liquid path) and an electro-thermal conversion element such as those disclosed in U.S. Patents cited above, and also a print head having a structure including a curved heating surface such as that disclosed in U.S. Pat. Nos. 4,558,333 or 4,459,600 may be employed as the print head in the present invention. Furthermore, the present invention may preferably be applied also to a print head having the structure disclosed in Japanese Patent Laid-Open No. 59-123670 in which a slit is used a common emission opening for a plurality of electro-thermal conversion elements, and to a print head having the structure disclosed in Japanese Patent Laid-Open No. 59-138461 in which there are provided openings corresponding to emission openings thereby absorbing pressure waves produced by thermal energy. Thus, the present invention may be applied to various types of print heads to improve the printing performance.

Furthermore, the present invention may also be applied to a print head of the full line type having a length corresponding to the maximum allowed width of a printing medium which can be dealt with by a printing apparatus. The print head of such a type may be implemented either with a combination of plurality of print heads or with a head constructed in a single form.

Furthermore, in the case of serial types, the present invention may preferably applied to a print head of the type which is mounted at a fixed location on the main part of a printing apparatus, or of the type which can be exchangeable mounted on the main part of a printing apparatus in such a manner as to make electrical connection and ink supplying connection between the print head and the main part of the printing apparatus, or of the cartridge type having an ink tank disposed on the print head in an integral fashion.

It is desirable that the printing apparatus used in the present invention have means for recovering the emission performance of the print head, and other auxiliary means. More specifically, capping means, cleaning means, compression or suction means, etc., may be added to a print head, pre-heating means may be provided separately from the electro-thermal conversion elements or may be provided in a form combined with the electro-thermal conversion elements, and pre-emission means for performing an ink emission before an actual emitting operation may be provided.

Furthermore, two or more print heads may be mounted on the printing apparatus so as to deal with a plurality of inks having different colors or densities. That is, the present invention may be applied in a very preferable manner to a printing apparatus having the capability of, in addition to a single color mode using a main color such as black, a multi-color mode using various colors or a full-color mode using a mixture of colors by means of an integral type print head or a combination of a plurality of heads.

In the embodiments described above, ink in a liquid form is employed. Alternatively, ink of the type which becomes solid at room temperature or lower temperatures may also be employed. In the case of ink-jet type print heads, the temperature of the ink is usually controlled so that the ink is maintained at a temperature in the range from 30° C. to 70° C. thereby controlling the viscosity of the ink within the range which results in stable emission. Therefore, solid ink may be employed as long as the ink becomes liquid when emitted. If ink of the type which is solid under a usual condition is employed, the ink may be heated using the heating process described above so that the ink may become liquid. In this case, evaporation of ink is prevented. Thus, various types of inks may preferably be employed in the present invention, including such a type which becomes liquid only when thermal energy is applied to the ink in response to a printing signal, and such a type which starts to become solid before arriving at a printing medium. An example of such a type is disclosed in Japanese Patent Laid-Open No. 54-56847 or 60-71260, in which the ink is stored in a solid state in recessed portions or through-holes formed in a sheet of a porous material which is disposed so that it faces electro-thermal conversion elements. When any type of ink is employed in the present invention, it is most preferable that the film boiling technique described above is employed.

The ink-jet type printing apparatus according to the present invention may be implemented in various forms including an image output terminal of an information device such as a computer, a copying machine coupled with a reader, a facsimile device having transmission and reception capability, etc.

In the present embodiment, as described above, adjacent nozzles disposed on a print head are driven at the same time thereby achieving an operation at an increased driving frequency or at an increased speed, wherein dot-shifting is performed on the data to be printed in such a manner that edges and solid areas are extracted from the original data to be printed using detection means for extracting, and arbitrarily selected proper rasters only in the solid areas are shifted thereby preventing the generation of mist which would otherwise occur as a result of the increase in the operation speed. Thus, the present invention provides the dot-data shifting technique and the printing apparatus using this dot-data shifting technique which make it possible to print a high-quality image at a high speed.

What is claimed is:

1. A printing method for use in a printing apparatus including a plurality of printing elements and printing control means for driving said plurality of printing elements in such a manner that said plurality of printing elements are grouped into a plurality of blocks and the printing elements belonging to the same block are driven at substantially the same time, said printing method comprising the steps of:

a detection step of detecting the edges of a printing area of input image data; and a printing control step of controlling a printing operation so that image data consisting of the printing area of the input image data excluding said detected edges is printed in such a manner that an arbitrary raster of the data is shifted from printing positions corresponding to the resolution of said image data by an amount less than a dot-to-dot distance of said resolution.

2. A printing method according to claim 1, further comprising a solid area detecting step for detecting a solid area, excluding the edges, from the printing area of the input image data, wherein, in said detection step, the edge of the printing area is detected in accordance with said solid area.

3. A printing method according to claim 1, further comprising a generation step of generating printing data by shifting an arbitrary raster of the image data consisting of the printing area of the input image data excluding said detected edges from printing positions corresponding to the resolution of said image data by an amount less than a dot-to-dot distance of said resolution, wherein said printing control step is performed on the basis of the printing data generated in said generation step.

4. A printing method according to claim 1, wherein:

said printing apparatus performs a printing operation according to a serial printing technique in which a print head on which said plurality of printing elements are disposed is scanned over a printing medium; and in said printing control step, said arbitrary raster of the shifted data is printed during a scanning operation different from a scanning operation in which the other data is printed.

5. A printing method according to claim 4, wherein in said printing control step, said arbitrary raster of the shifted data is printed during a scanning operation in which said print head is scanned in a direction opposite to the direction in which said print head is scanned for printing the other data.

6. A printing method according to claim 4, wherein in said printing control step, said arbitrary raster of the shifted data and the other data are printed during scanning operations in which said print head travels in the same direction.

7. A printing method according to claim 1, wherein in said printing control step, the direction in which said arbitrary raster of the image data consisting of the printing area of the input image data excluding said detected edges is shifted is assigned evenly to forward and backward directions relative to printing positions corresponding to the resolution of said image data.

8. A printing method according to claim 1, in said printing control step, said shifting operation on an arbitrary raster of data is performed only for image data having a predetermined particular color.

9. A printing method according to claim 1, wherein said printing elements are an electro-thermal conversion element, and said print head is of the ink-jet type in which thermal energy is applied to ink thereby emitting the ink.

10. A printing method according to claim 9, wherein said print head induces a change in the state of ink by applying heat to the ink via said electro-thermal conversion elements so as to generate a pressure based on said change in the state of the ink thereby emitting the ink.

11. A printing apparatus for printing data on a printing medium using a print head on which a plurality of printing elements, comprising:

block driving means for driving said plurality of printing elements in such a manner that said plurality of printing elements are grouped into a plurality of blocks and the printing elements belonging to the same block are driven at substantially the same time;

detection means for detecting the edges of a printing area of input image data; and printing control means for controlling a printing operation so that image data consisting of the printing area of the input image data excluding said detected edges is printed in such a manner that an arbitrary raster of the data is shifted from printing positions corresponding to the resolution of said image data by an amount less than a dot-to-dot distance of said resolution.

12. A printing apparatus according to claim 11, further comprising solid area detecting means for detecting a solid area, excluding the edges, from the printing area of the input image data, wherein said detection means detects the edge of the printing area in accordance with said solid area.

13. A printing apparatus according to claim 11, further comprising generation means for generating printing data by shifting an arbitrary raster of the image data consisting of the printing area of the input image data excluding said detected edges from printing positions corresponding to the resolution of said image data by an amount less than a dot-to-dot distance of said resolution, wherein said printing control means performs a printing operation via said block driving means on the basis of the printing data generated by said generation means.

14. A printing apparatus according to claim 11, further comprising:

scanning means for scanning the print head, on which said plurality of printing elements are disposed, over a printing medium; and head driving means for driving the print head via said block driving means during a scanning operation in which the print head is scanned by said scanning means, thereby performing a printing operation;

wherein said printing control means controls the printing operation so that said arbitrary raster of the shifted data is printed during a scanning operation different from a scanning operation in which the other data is printed.

15. A printing apparatus according to claim 14, wherein said printing control means controls the printing operation so that said arbitrary raster of the shifted data is printed during a scanning operation in which said print head is scanned in a direction opposite to the direction in which said print head is scanned for printing the other data.

16. A printing apparatus according to claim 14, wherein said printing control means controls the printing operation so that said arbitrary raster of the shifted data and the other data are printed during scanning operations in which said print head travels in the same direction.

17. A printing apparatus according to claim 11, said printing control means controls the printing operation so that the direction in which said arbitrary raster of the image data consisting of the printing area of the input image data excluding said detected edges is shifted is assigned evenly to forward and backward directions relative to printing positions corresponding to the resolution of said image data.

18. A printing apparatus according to claim 11, wherein said printing control means controls the printing operation so that said shifting operation on an arbitrary raster of data is performed only for image data having a predetermined particular color.

19. A printing apparatus according to claim 11, further comprising:

means for detecting the duty ratio of dots in a plurality of rasters of data to be printed; and decision means for deciding whether an arbitrary raster of data should be shifted or not on the basis of said duty ratio.

20. A printing apparatus according to claim 11, further comprising:

means for detecting the duty ratio of dots in a plurality of rasters of data to be printed; and modification means for changing the number of arbitrary rasters to be shifted depending on the basis of said duty ratio.

21. A printing apparatus according to claim 11, wherein said printing elements are an electro-thermal conversion element, and said print head is of the ink-jet type in which thermal energy is applied to ink thereby emitting the ink.

22. A printing apparatus according to claim 21, wherein said print head induces a change in the state of ink by applying heat to the ink via said electro-thermal conversion elements so as to generate a pressure based on said change in the state of the ink thereby emitting the ink.

23. A method for shifting dot data, for use in a printing apparatus including a plurality of printing elements and printing control means for driving said plurality of printing elements in such a manner that said plurality of printing elements are grouped into a plurality of blocks and the printing elements belonging to the same block are driven at substantially the same time, said method comprising the steps of:

a detection step of detecting the edges of a printing area of input image data; and a generation step of generating printing data by shifting an arbitrary raster of the image data consisting of the printing area of the input image data excluding said detected edges from printing positions corresponding to the resolution of said image data by an amount less than a dot-to-dot distance of said resolution.

24. A printing method according to claim 1, further comprising:

a detecting step of detecting the duty ratio of dots in a plurality of rasters of data to be printed; and a deciding step of deciding whether an arbitrary raster of data should be shifted or not on the basis of said duty ratio.

25. A printing method according to claim 1, further comprising:

a detecting step of detecting the duty of dots in a plurality of rasters of data to be printed; and a changing step of changing the number of arbitrary rasters to be shifted depending on the basis of said duty ratio.

26. A printing method according to claim 2, wherein in said solid area detecting step, said solid area is detected by discriminating the data representing dots to be recorded side by side from an arbitrary raster of the input image data.

27. A printing method according to claim 2, wherein in said solid area detecting step, said solid area is detected by discriminating the data representing dots to be recorded and being surrounded by the data representing dots to be recorded.

28. A printing method according to claim 1, wherein the data is shifted by the amount which is half of a dot-to-dot distance of said resolution.

29. A method according to claim 23, further comprising a solid area detecting step for detecting a solid area, excluding the edges, from the printing area of the input image data; and wherein in said detection step, the edge of the printing area is detected in accordance with said solid area.

30. A method according to claim 23, wherein said arbitrary raster of the image data consisting of the printing area of the input image data excluding said detected edges is shifted in the directions assigned evenly to forward and backward relative to printing positions corresponding to the resolution of said image data.

31. A method according to claim 23, wherein:

said printing apparatus is capable of recording plural colors; and in said generation step, said shifting operation on an arbitrary raster of data is performed only for image data having a predetermined particular color.

32. A method according to claim 29, wherein in said solid area detecting step, wherein in said solid area detecting step, said solid area is detected by discriminating the data representing dots to be recorded side by side from an arbitrary raster of the input image data.

33. A method according to claim 29, wherein in said solid area detecting step, said solid area is detected by discriminating the data representing dots to be recorded and being surrounded by the data representing dots to be recorded.

34. A method according to claim 23, wherein the data is shifted by the amount which is half of a dot-to-dot distance of said resolution.

35. A printing apparatus according to claim 12, wherein said solid area detecting means detects said solid area by discriminating the data representing dots to be recorded side by side from an arbitrary raster of the input image data.

36. A printing apparatus according to claim 12, wherein said solid area detecting means detects said solid area by discriminating the data representing dots to be recorded and being surrounded by the data representing dots to be recorded.

37. A printing apparatus according to claim 11, wherein the data is shifted by the amount which is half of a dot-to-dot distance of said resolution.

* * * * *

UNITED STATES PATENT AND TRADEMARK OFFICE
CERTIFICATE OF CORRECTION

PATENT NO. : 5,982,998

DATED : November 9, 1999

INVENTORS : KIICHIRO TAKAHASHI, et al.                Page 1 of 2

It is certified that error appears in the above-identified patent and that said Letters Patent is hereby corrected as shown below:

COVER PAGE

Under [56] References Cited, Foreign Patent Documents,
" 5-246033   9/1933   Japan" should read
--5-246033   9/1993   Japan--.

COLUMN 1

Line 12, "such the" should read --such a--; and
Line 26, "Such the" should read --Such--.

COLUMN 4

Line 37, "greater" should read --great--;
Line 48, "longer" should read --long--; and
Line 51, "higher" should read --high--.

COLUMN 5

Line 2, "of" should read --of the--.

COLUMN 6

Line 23, "A-E" should read --are--.

COLUMN 7

Line 5, "an" should read --a--; and
Line 11, "paris" should read --pairs--.

UNITED STATES PATENT AND TRADEMARK OFFICE
CERTIFICATE OF CORRECTION

PATENT NO. : 5,982,998

DATED : November 9, 1999

INVENTORS : KIICHIRO TAKAHASHI, et al.

It is certified that error appears in the above-identified patent and that said Letters Patent is hereby corrected as shown below:

COLUMN 9

Line 5, "is" should read --are--; and
  Line 27, "an" should be deleted.

COLUMN 11

Line 17, "driver" should read --driver.--.

COLUMN 12

Line 4, "illustrate" should read --illustrates--; and
  Line 67, "the" should be deleted.

COLUMN 14

Line 55, "exchangeable" should read --exchangeably--.

Signed and Sealed this

Tenth Day of October, 2000

*Attest:*

Q. TODD DICKINSON

*Attesting Officer*      *Director of Patents and Trademarks*